(12) United States Patent
Naim et al.

(10) Patent No.: US 8,862,718 B2
(45) Date of Patent: Oct. 14, 2014

(54) SYSTEM, METHOD AND APPARATUS FOR TROUBLESHOOTING AN IP NETWORK

(75) Inventors: Ghassan Naim, Plano, TX (US); Srikrishna Kurapati, Richardson, TX (US)

(73) Assignee: Avaya Inc., Basking Ridge, NJ (US)

(*) Notice: Subject to any disclaimer, the term of this patent is extended or adjusted under 35 U.S.C. 154(b) by 380 days.

(21) Appl. No.: 11/776,549

(22) Filed: Jul. 11, 2007

(65) Prior Publication Data

US 2008/0016515 A1 Jan. 17, 2008

Related U.S. Application Data

(60) Provisional application No. 60/830,411, filed on Jul. 12, 2006.

(51) Int. Cl.
G06F 15/173 (2006.01)
G06F 15/16 (2006.01)
H04L 9/32 (2006.01)
H04L 29/06 (2006.01)

(52) U.S. Cl.
CPC ........ H04L 63/0227 (2013.01); H04L 63/1425 (2013.01); H04L 63/20 (2013.01)
USPC ............................ 709/224; 709/227; 713/171

(58) Field of Classification Search
USPC .................................. 709/224, 227; 713/171
See application file for complete search history.

(56) References Cited

U.S. PATENT DOCUMENTS

| | | | |
|---|---|---|---|
| 5,581,610 A | 12/1996 | Hooshiari | |
| 6,137,782 A * | 10/2000 | Sharon et al. | 370/255 |
| 6,253,326 B1 | 6/2001 | Lincke et al. | |
| 6,363,065 B1 | 3/2002 | Thornton et al. | |
| 6,498,791 B2 | 12/2002 | Pickett et al. | |
| 6,501,763 B1 * | 12/2002 | Bhagavath et al. | 370/432 |
| 6,598,183 B1 | 7/2003 | Grieco et al. | |
| 6,665,293 B2 | 12/2003 | Thornton et al. | |
| 6,721,424 B1 | 4/2004 | Radatti | |
| 6,757,823 B1 | 6/2004 | Rao et al. | |
| 6,769,016 B2 | 7/2004 | Rothwell et al. | |
| 6,781,955 B2 | 8/2004 | Leung | |
| 6,791,955 B1 | 9/2004 | Kikuchi et al. | |
| 6,816,455 B2 | 11/2004 | Goldberg et al. | |
| 6,842,449 B2 | 1/2005 | Hardjono | |
| 7,046,680 B1 | 5/2006 | McDysan et al. | |

(Continued)

OTHER PUBLICATIONS

International Search Report and Written Opinion for PCT/US2007/073290 dated Apr. 15, 2008.

(Continued)

*Primary Examiner* — Ranodhi Serrao
(74) *Attorney, Agent, or Firm* — Sheridan Ross P.C.

(57) ABSTRACT

The present invention provides a system, method and apparatus for troubleshooting one or more communications between a first device and a second device. A monitoring device disposed between the first device and the second device receives a message associated with the communication(s), analyzes the received message and stores the analyzed message whenever the analyzed message satisfies one or more troubleshooting criteria. The one or more troubleshooting criteria may include one or more data element criteria, one or more event-based criteria, one or more time-based criteria, one or more logical operators or a combination thereof. The method can be implemented using a computer program embodied on a computer readable medium having one or more code segments to perform the method steps.

19 Claims, 14 Drawing Sheets

(56) References Cited

U.S. PATENT DOCUMENTS

| | | | |
|---|---|---|---|
| 7,055,027 B1 | 5/2006 | Gunter et al. | |
| 7,181,010 B2* | 2/2007 | Russ et al. | 380/234 |
| 7,197,643 B2 | 3/2007 | Takase | |
| 7,206,932 B1 | 4/2007 | Kirchhoff | |
| 7,313,816 B2 | 12/2007 | Sinha et al. | |
| 7,330,968 B2 | 2/2008 | Kimura | |
| 7,380,011 B2 | 5/2008 | Li et al. | |
| 7,383,574 B2 | 6/2008 | Burrows et al. | |
| 7,385,957 B2 | 6/2008 | O'Neill | |
| 7,454,421 B2 | 11/2008 | Imaeda et al. | |
| 7,508,767 B2 | 3/2009 | Shinomiya | |
| 7,543,332 B2 | 6/2009 | Balissat et al. | |
| 7,681,101 B2 | 3/2010 | Oran et al. | |
| 7,720,462 B2 | 5/2010 | Chu | |
| 8,027,251 B2 | 9/2011 | Ormazabal et al. | |
| 8,341,724 B1 | 12/2012 | Burns et al. | |
| 8,364,807 B1 | 1/2013 | Lewis | |
| 8,464,329 B2 | 6/2013 | Fogel | |
| 8,477,605 B2 | 7/2013 | Elliott et al. | |
| 8,477,759 B2 | 7/2013 | Dyck et al. | |
| 2002/0099854 A1 | 7/2002 | Jorgensen | |
| 2002/0129236 A1 | 9/2002 | Nuutinen | |
| 2003/0009699 A1 | 1/2003 | Gupta et al. | |
| 2003/0110286 A1 | 6/2003 | Antal et al. | |
| 2004/0042470 A1 | 3/2004 | Cooper et al. | |
| 2004/0083299 A1 | 4/2004 | Dietz et al. | |
| 2004/0086093 A1 | 5/2004 | Schranz | |
| 2004/0161086 A1 | 8/2004 | Buntin et al. | |
| 2004/0203799 A1 | 10/2004 | Siegel | |
| 2004/0260560 A1* | 12/2004 | Holloway et al. | 704/273 |
| 2005/0015488 A1* | 1/2005 | Bayyapu | 709/225 |
| 2005/0132060 A1* | 6/2005 | Mo et al. | 709/227 |
| 2005/0201363 A1 | 9/2005 | Gilchrist et al. | |
| 2005/0232193 A1 | 10/2005 | Jorgensen | |
| 2005/0249214 A1 | 11/2005 | Peng | |
| 2005/0259667 A1 | 11/2005 | Vinokurov et al. | |
| 2005/0272449 A1* | 12/2005 | Gallagher et al. | 455/458 |
| 2006/0028980 A1 | 2/2006 | Wright | |
| 2006/0036727 A1* | 2/2006 | Kurapati et al. | 709/224 |
| 2006/0288411 A1 | 12/2006 | Garg et al. | |
| 2007/0076853 A1 | 4/2007 | Kurapati et al. | |
| 2007/0121596 A1 | 5/2007 | Kurapati et al. | |
| 2007/0204060 A1 | 8/2007 | Higuchi et al. | |
| 2007/0248091 A1 | 10/2007 | Khalid et al. | |
| 2008/0016334 A1 | 1/2008 | Kurapati et al. | |
| 2008/0229382 A1 | 9/2008 | Vitalos | |
| 2009/0094671 A1 | 4/2009 | Kurapati et al. | |
| 2009/0144820 A1 | 6/2009 | Kurapati et al. | |
| 2011/0173697 A1 | 7/2011 | Kurapati et al. | |

OTHER PUBLICATIONS

International Search Report and Written Opinion for PCT/US2007/073298 dated Aug. 21, 2008.
Tyson, Jeff and Valdes, Robert, "How VoIP Works" http://computer.howstuffworks.com/ip-telephony.htm.
AT&T Natural Voices at www.naturalvoices.att.com/, Sep. 13, 2005, accessed through www.archive.org on Jul. 9, 2007, 1 page.
Bell Labs Text-to-Speech Synthesis, Lucent Technologies, www.bell-labs.com/project/tts/voices.html; Sep. 11, 2005; accessed through www.archive.org on Jul. 9, 2007, 2 pages.
Data Compression Download Source Code and Papers at www.data-compression.com/download.shtml, accessed May 2005, 3 pages.
Data Compression—Speech—Commercial Libraries, Visicron www.datacompression.info/Speech.shtml, 2005, 12 pages.
Digital Libraries Initiative Phase 2, at www.dli2.nsf.gov, Nov. 28, 2003, 2 pages.
Hidden Markov Model Toolkit, www.htk.eng.cam.ac.ukf, Sep. 9, 2005, 4 pages.
ITU-T. Recommendation G.191, Software Tool Library 2000 User's Manual. ITU, Geneva, Dec. 2000, 193 pages.
ITU-T. Recommendation G. 711, Pulse code molulation (PCM) of voice frequencies, volume Fascicle 111.4 of Blue Book, pp. 175-184, ITU, Geneva, 1989, 12 pages.
ITU-T. Recommendation G.729, Coding of Speech at 8 kbps using Conjugate-Structure Algebraic-Code-Excited Linear-Prediction (CS-ACELP). ITU, Geneva, Mar. 1996, 39 pages.
Microsoft Text-to-Speech Package at ww.microsoft.com/reader/developers/downloads/tts.asp; Sep. 8, 2005; accessed through www.archive.org on Jul. 9, 2007, 2 pages.
New Podcast-CounterHegemony Podcast, at www.ipodder.org/, Sep. 4, 2005; accessed through www.archive.org on Jul. 9, 2007, 8 pages.
Speech Compression, wvvw.data-compression.com/speech.shtml, accessed May 2005, 13 pages.
US Congress, CAN-SPAM Act of 2003, www.spamlaws.com/federal/108s877.shtml, accessed Jul. 9, 2007, 22 pages.
International Search Report and Written Opinion for PCT/US2007/014871 dated Sep. 11, 2008, 11 pages.
Official Action for U.S. Appl. No. 12/189,151, mailed Dec. 29, 2011, 21 pages.
Official Action for U.S. Appl. No. 11/776,509, mailed Jun. 9, 2011, 3 pages Advisory Action.
Notice of Allowance for U.S. Appl. No. 11/776,509, mailed Jan. 6, 2012, 8 pages.
Official Action for U.S. Appl. No. 12/189,151, mailed Oct. 10, 2013, 19 pages.
Final Action for U.S. Appl. No. 12/189,151, mailed Jan. 4, 2013, 22 pages.
Official Action for U.S. Appl. No. 11/776,509, mailed Aug. 18, 2008, 11 pages.
Final Office Action for U.S. Appl. No. 11/776,509, mailed Mar. 17, 2011, 44 pages.
Stein, L. D. and Stewart, J. N., "The World Wide Web Security FAQ, Version 3.1.2, Feb. 4, 2002," http://www.w3.org/Security/Faq/.
Tyson, Jeff and Valdes, Robert, "How VoIP Works" http://computer.howstuffworks.com/ip-telephony.htm Jul. 9, 2007.
International Search Report and Written Opinion of the International Searching Authority for PCT/US2006/035903 dated Apr. 23, 2007.
International Search Report and Written Opinion of the International Searching Authority for PCT/US2006/031499 dated May 24, 2007.

* cited by examiner

SYSTEM, METHOD AND APPARATUS FOR TROUBLESHOOTING AN IP NETWORK

CROSS-REFERENCE TO RELATED APPLICATIONS

This application is related to U.S. patent application Ser. No. 11/776,509 filed on Jul. 11, 2007 and entitled "System, Method and Apparatus for Securely Exchanging Security Keys and Monitoring Links in an IP Communications Network" which claims priority to U.S. provisional patent application 60/830,168 filed on Jul. 12, 2006 and entitled "System, Method and Apparatus for Securely Exchanging Security Keys and Monitoring Links in an IP Communications Network", all of which are hereby incorporated by reference in its entirety, all of which are incorporated herein by reference.

PRIORITY CLAIM TO RELATED APPLICATIONS

This patent application is a non-provisional application of U.S. provisional patent application 60/830,411 filed on Jul. 12, 2006 and entitled "System, Method and Apparatus for Troubleshooting an IP Network" which is hereby incorporated by reference in its entirety.

FIELD OF THE INVENTION

The present invention relates generally to the field of communications and, more particularly, to a system, method and apparatus for troubleshooting an IP network.

BACKGROUND OF THE INVENTION

Existing Internet Protocol (IP) based monitoring devices, systems and software that are used to troubleshoot IP-based networks only decode messages at a single protocol layer. Moreover, the trace files collected by these devices only contain data about messages passing through the interface at the specific layer. In addition, these devices, systems and software do not provide trace files and troubleshooting files: (1) based on specific data element criteria; (2) based on specific event criteria; or (3) containing messages received before and after the troubleshooting criteria are detected. In other words, the troubleshooting report does not contain all messages exchanged during the call setup procedure for the call that corresponds to specific troubleshooting criteria.

Furthermore, these devices, systems or software cannot correlate traces and troubleshooting information extracted: (1) at the same protocol layer; (2) at multiple protocol layers on a given network interface; or (3) at multiple protocol layers on multiple network interfaces. Finally, these devices, systems or software do not provide an intelligent node or device that can trace, filter and process several traces and troubleshooting files from several protocol layers and several network interfaces in order to narrow down and identify specific individual problems. As a result, there is a need for a system, method and apparatus for troubleshooting an IP network that overcomes the aforementioned deficiencies.

SUMMARY OF THE INVENTION

The present invention provides a system, method and apparatus for troubleshooting any real time IP-based communications, such as Voice Over IP (VoIP), Instant Messaging (IM), Multimedia (MM) messages, Video, etc. The present invention monitors packet stream(s) on a given IP link and captures all packets related to specific troubleshooting criteria selected at a graphical user interface (GUI) at a control node, such as an Internet Protocol Communications Security (IPCS) Intelligence and Element Management System (EMS) node, in a network operations center (NOC). The results are captured in one or more log files at the monitoring node, such as an IPCS Media and Signaling node. The log files contain all packets and messages that are associated with the troubleshooting criteria in question. Once reported to the IPCS Intelligence & EMS node from the IPCS Media and Signaling node(s), the log files can be viewed using Ethereal for post-processing, analysis and troubleshooting.

The trace files and troubleshooting files provided by the present invention are based on specific data element criteria, specific event criteria and contain messages received before and after the troubleshooting criteria are detected. As a result, the troubleshooting report contains all messages exchanged during the call setup procedure for the call that corresponds to specific troubleshooting criteria. Moreover, the present invention can correlate traces and troubleshooting information extracted: (1) at the same protocol layer; (2) at multiple protocol layers on a given network interface; or (3) at multiple protocol layers on multiple network interfaces. As a result, the present invention can be used to trace, filter and More specifically, the present invention provides, in part, a method for troubleshooting one or more communications between a first device and a second device. A monitoring device disposed between the first device and the second device receives a message associated with the communication(s), analyzes the received message and stores the analyzed message whenever the analyzed message satisfies one or more troubleshooting criteria. The one or more troubleshooting criteria may include one or more data element criteria, one or more event-based criteria, one or more time-based criteria, one or more logical operators or a combination thereof. The method can be implemented using a computer program embodied on a computer readable medium having one or more code segments to perform the method steps.

The present invention also provides a method for troubleshooting one or more communications between a first device and a second device. A monitoring device disposed between the first device and the second device receives a message associated with the communication(s), decodes the received message and analyzes the decoded message. The analyzed message is stored in a history buffer whenever the analyzed message does not satisfy one or more troubleshooting criteria. The analyzed message is stored in an existing log file whenever the analyzed message satisfies the troubleshooting criteria and the analyzed message is part of one or more active troubleshooting sessions. A new log file is created and the analyzed message is stored in the new log file whenever the analyzed message satisfies the troubleshooting criteria and the analyzed message is not part of the active troubleshooting sessions. The method can be implemented using a computer program embodied on a computer readable medium having one or more code segments to perform the method steps.

In addition, the present invention provides an apparatus for troubleshooting one or more communications between a first device and a second device. The apparatus includes a first interface, a second interface, a data storage, and a processor communicably coupled to The present invention also provides an apparatus for troubleshooting one or more communications between a first device and a second device. The apparatus includes a first interface, a second interface, a data storage, and a processor communicably coupled to the first interface, the second interface and the data storage. The processor receives a message associated with the communication(s), decodes the received message and analyzes the decoded message. The analyzed message is stored in a history buffer whenever the analyzed message does not satisfy one or more troubleshooting criteria. The analyzed message is stored in an existing log file whenever the analyzed message satisfies the troubleshooting criteria and the analyzed message is part of one or more active troubleshooting sessions. A new log file is created and the analyzed message is stored in the new log file whenever the analyzed message satisfies the troubleshooting criteria and the analyzed message is not part of the active troubleshooting sessions.

Moreover, the present invention provides a system that includes a network control center, and one or more monitoring devices communicably coupled to the network control center and disposed between a first device and a second device. Each monitoring device includes a first interface, a second interface, a data storage and a processor communicably coupled to the first interface, the second interface and the data storage. The processor receives one or more troubleshooting criteria from the network control center via the first interface, receives a message associated with one or more communications between the first device and the second device via the second interface, analyzes the received message and stores the analyzed message in the data storage whenever the analyzed message satisfies the troubleshooting criteria.

The present invention also provides a system that includes a network control center, and one or more monitoring devices communicably coupled to the network control center and disposed between a first device and a second device. Each monitoring device includes a The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

Figure 1:
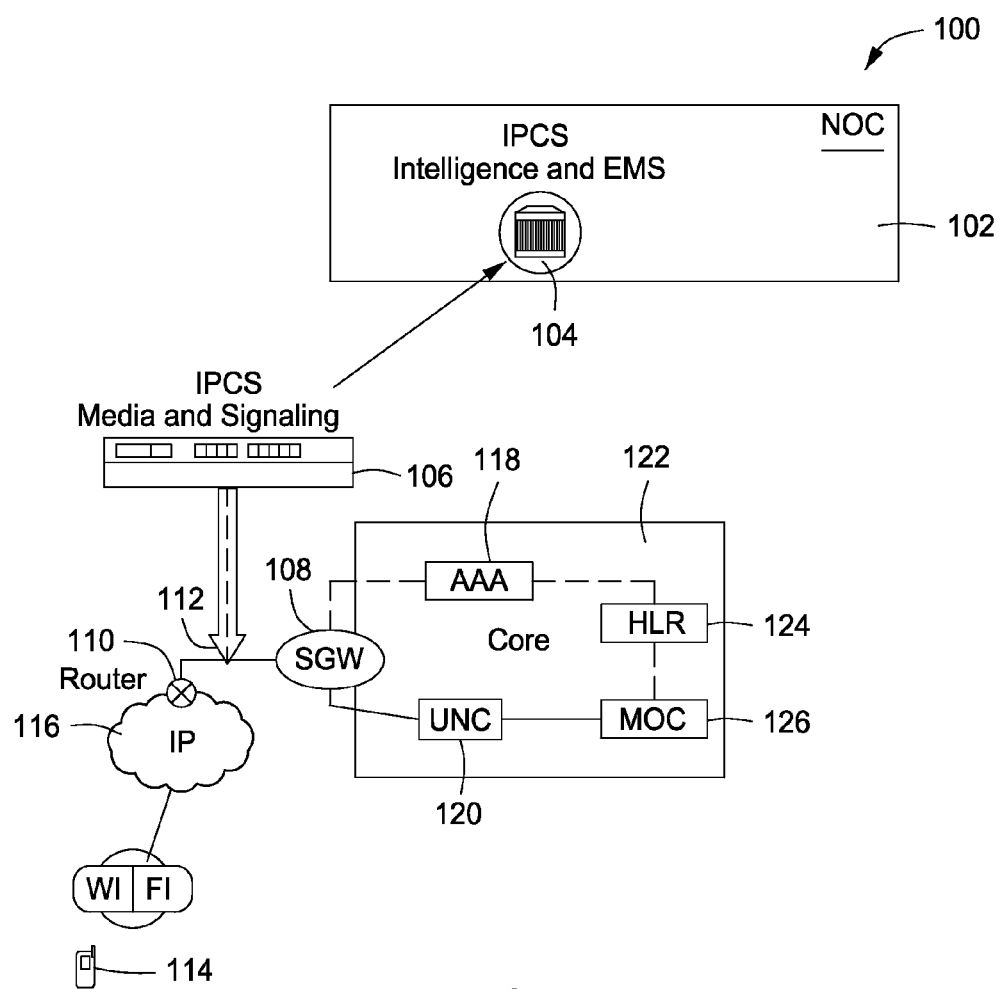
FIG. 1 depicts an IPCS Media and Signaling device in an Unlicensed Mobile Access (UMA) network in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to the processing of packet-based communications in Unlicensed Mobile As used herein, IMS (IP Multimedia Subsystem) is used as an example of a network technology to describe the solution. It is important to note that the invention still applies to any core network technology that uses IP as the transport layer for communication between the network entities. For instance, Unlicensed Mobile Access (UMA) network technology also applies to the current invention solution described herein. In addition, wireless access and wireless applications are used as example to describe the invention; however, the invention still applies to any access network and any application type that utilizes IP. Moreover, mobile handsets are used in the following description document to represent the end user device. However, the invention applies to any device that end user may use to establish a secure connection with a trusted network entity in the core network, e.g., a laptop, a soft client, a desktop, a PDA or any other device. Furthermore, the Packet Data Gateway (PDG) is used as an example to represent the trusted network entity in the core network and to describe the present invention, however, the invention applies to any network entity node that creates, via a generation process or selection from a predefined list, a Security Key for encryption purposes of messages exchanged in the network. Moreover, Internet Protocol Communication Security (IPCS) is used as an example of an application layer security node to describe the present invention. However, the invention still applies to any network entity that requires knowledge of the Security Key assigned by the trusted network entity. Additionally, Diffie-Hellman (DH) Key is used as a Security Key example to describe the present invention. However, the invention still applies to any security key type that is used in the network for any purpose. Even though IPSec is used in the present invention as the protocol between the IPCS and PDG for the Security Key information exchange, the invention applies to any other protocol that provides high security and eliminates eavesdropping from a third party. For instance, TLS is another protocol that provides a high level of security on the connection and make eavesdropping virtually impossible. In addition, even though the position of the IPCS in the network is used in the present invention as between SGW and the Border router in case of UMA and between the The following acronyms are used herein:
AAA Access, Authorization and Accounting
DH Diffie-Hellman
EMS Element Management System
GUI Graphical User Interface
HLR Home Location Register
IM Instant Messaging
IP Internet Protocol
IPCS Internet Protocol Communication Security
IPCS_IE IPCS Intelligence & EMS
IPCS_MS IPCS Media & Signaling
MM Multimedia
MSC Mobile Switching Center
NOC Network Operations Center
OAM&P Operations, Administration, Maintenance and Provisioning
PLM Product Line Management
SGW Secure Gateway
UMA Unlicensed Mobile Access
VoIP Voice over IP The present invention provides a system, method and apparatus for troubleshooting any real time IP-based communications, such as VoIP, IM, MM messages, Video, etc. The present invention monitors packet stream(s) on a given IP link and captures all packets related to specific troubleshooting criteria selected at a GUI at a control node, such as an IPCS_IE node, in a NOC. The results are captured in one or more log files at the monitoring node, such as an IPCS_MS node. The log files contain all packets and messages that are associated with the troubleshooting criteria in question. Once reported to the IPCS_IE node The trace files and troubleshooting files provided by the present invention are based on specific data element criteria, specific event criteria and contain messages received before and after the troubleshooting criteria are detected. As a result, the troubleshooting report contains all messages exchanged during the call setup procedure for the call that corresponds to specific troubleshooting criteria. Moreover, the present invention can correlate traces and troubleshooting information extracted: (1) at the same protocol layer; (2) at multiple protocol layers on a given network interface; or (3) at multiple protocol layers on multiple network interfaces. As a result, the present invention can be used to trace, filter and process several traces and troubleshooting files from several protocol layers and several network interfaces in order to narrow down and identify specific individual problems. Moreover, the present invention can back track and extract specific messages related to a specific call from the trace files and troubleshooting files.

Note that the present invention can be implemented in the "System and Method for Providing Network Level and Nodal Level Vulnerability Protection in VoIP Networks" described in U.S. Patent Publication No. US-2007-01215960A1 published on May 31, 2007, which is incorporated herein in its entirety.

Now referring to FIG. 1, an IPCS Media and Signaling device in an UMA network 100 in accordance with one embodiment of the present invention is shown. The network includes a NOC 102 having an IPCS Intelligence & EMS node 104 communicably coupled to one or more monitoring devices (IPCS Media & Signaling node) 106. The IPCS Intelligence & EMS node 104 provides OAM&P functionality to all IPCS Media & Signaling nodes 106 deployed in the network 100. The IPCS Media & Signaling node 106 is disposed between a first device (SGW) 108 and a second device (Router) 110. The IPCS Media & Signaling node 106 is communicably connected between the first device 108 and the second device 110 at point 112 or is communicably connected to a tap or tapping device 112 communicably connected (link) between the first device 108 and the second device 110.

There are many options in providing a tap function on the link to allow monitoring of every packet sent on the link, and based on the operator preferences, the best option is selected. Copper and optic wire taps/technology or any other applicable wire tap technology and type can be used. In the case where a copper link is used between the SGW 108 and border router 110, a copper-to-copper tap device 112 is used where it will take copper inlet from the link and gives copper outlet towards the IPCS_MS node 106. In the case where an optic link is used between the SGW 108 and border router 110, an opti-to-copper tap 112 is used where it will take optic inlet from the link and gives copper outlet towards the IPCS_MS node 106. Each tap 112 results in two links towards the IPCS_MS 106, one for downstream and another for upstream. Hence, two ports are required on the IPCS_MS 106 per tap 112. The tap 112 establishes permanent passive access ports without introducing a point of failure and passes full-duplex traffic from all layers with zero impact on network traffic and network performance around the clock. No IP address is needed for the tap 112 hence enhancing monitoring and troubleshooting security. As shown, the router 110 is communicably coupled to an end user or user equipment 114 via one or more IP networks 116. The SGW 108 is communicably coupled to an AAA Server 118 and an UNC 120 within a core network 122. A HLR 124 is communicably coupled to the AAA Server 118 and a MSC 126.

The IPCS_MS node 106 provides the following functionalities and capabilities:
Message Decryption
Message Decoding
Message Capturing and filtering based on troubleshooting criteria. Messages that do not match the troubleshooting criteria are not logged but "sinked" after analysis.
Up to a configurable maximum number of troubleshooting sessions can be active at the same time on a single IPCS_MS node 106
Store and Forward to IPCS_IE node 104 over Secure-FTP interface
Push and Pull capability for logs transfer from IPCS_MS node 106 to IPCS_IE node 104
Push and Pull capability for Performance Statistics files transfer from IPCS_MS node 106 to IPCS_IE node 104

The IPCS_IE node 104 provides the following functionalities and capabilities:
Troubleshooting Operation is done using EMS GUI
Activation of Troubleshooting and Capturing sessions based on Data Element criteria
Activation of Troubleshooting and Capturing sessions based on Event criteria
Troubleshooting session initiation population on multiple IPCS_MS nodes 106
Support of multiple S-FTP sessions towards multiple IPCS_MS nodes 106
"Pull" and "Push" support towards single or multiple IPCS_MS nodes 106

Interface to external server for off-loading storage of log data files.

The well known Ethereal packet viewing tool is available on the IPCS_IE node 104 and can be used to view the messages stored in log data files. Extended information about each message can be obtained by using the Ethereal tool. Note that any other tool that can read pcap or other formats can be used.

Warnings and Alarms

Performance Statistics

"Push" and "Pull" support of Performance Statistics from IPCS_MS node 106

One or more specific troubleshooting criteria can be selected from a list at IPCS_IE 104 to start a Troubleshooting session at the IPCS_MS node 106. All messages of a call associated with the specified criteria are captured at IPCS_MS node 106. Additional criteria can be implemented as per additional requirements. For example, the following data-based criteria are supported:

IMSI
P-TMSI
IP Address
Subnet Mask
UMA Classmark
Cell Identity
Location Area Identity
Routing Area Identity
AP Identity
IP Subnet Mask
IPSec Tunnel Identity IP Address—IPCS will capture all messages passing through the specified tunnel
SGW Identity IP address—IPCS will capture all messages passing through the specified SGW
UNC Identity IP address—IPCS will capture all messages passing through the specified UNC
Border Router IP address—IPCS will capture all messages passing through the specified Router
Protocol type. User can specify from the following protocols:
IKE
UMA The following event-based criteria are also supported:

IPSec failure
Registration failure
GSM to UMA Handoff
UMA to GSM Handoff
MM Authentication Failure
AAA Authentication Failure
Location Update Failure
CM_Service Reject
GPRS Attach Failure
PDP Context Failure In addition, some of the event-based criteria are associated with one or more sub-criteria. When the user admin selects an event-based criteria at the GUI he/she is given the option to select one/multiple sub-criteria with it. If no sub-criteria is selected, the event-based criteria acts as the sole trigger for the troubleshooting session. Taking the event-based criteria "Registration Failure" as an example, the sub-criteria that can be selected is the cause associated with the registration failure event that is also accompanied in the message Register_Reject. Each cause can be selected as a sub-criteria. For example, a list of causes and sub-criteria follows:

| Register Reject Cause IE Value | Sub-criteria |
|---|---|
| 0 | Network Congestion |
| 1 | AP not allowed |
| 2 | Location not allowed |
| 3 | Invalid UNC |
| 4 | Geo Location not known |
| 5 | IMSI not allowed |
| 6 | Unspecified |
| 7 | UNC-SGW certificate not valid |
| 8 | EAP_SIM authentication failed |
| 9 | TCP establishment failed |
| 10 | Redirection |
| 11 | EAP_AKA authentication failed |

This same concept applies to any other event-based criteria that are supported.

The present invention provided the following troubleshooting functions an operation:

Troubleshooting Session Activation
A Troubleshooting session is created and activated at the IPCS_IE GUI.
Multiple active Troubleshooting sessions can be supported at the same time.
IPCS_IE 104 provides a limitation on the maximum number active sessions on a single IPCS_MS node 106. A configurable maximum number of Troubleshooting sessions can be active at the same time on a given single IPCS_MS node 106.
A single troubleshooting session can consist of a single or multiple troubleshooting criteria of same type (event or data-based). Logical operators, such as AND and OR, can be applied on multiple criteria to compose a single troubleshooting session. Up to a configurable maximum number of logical operations can be included in a single session.
A troubleshooting session can be rejected at the EMS for the following reasons:
Number of logical operations is higher than the maximum allowed
Maximum number of troubleshooting sessions allowed on given IPCS_MS node 106 is reached
Invalid session start time (e.g., before current time clock)
Invalid session duration (e.g., zero)
A troubleshooting session can be provisioned at IPCS_IE node 104 then populated to multiple IPCS_MS nodes 106 in the network 100.
From EMS perspective, a troubleshooting session parameters includes the following:
Troubleshooting criteria (includes operations done on multiple criteria)
Session start time
Session duration
Any Troubleshooting session can be manually deactivated from EMS before its scheduled active duration.
Logging and Reporting
A history of messages is saved in a time sliding window.
Upon detection of one or more criteria, all messages available in the history buffer that correspond to the criteria are extracted and logged as part of the troubleshooting session logs. The size of the history buffer is limited by the local IPCS_MS node 106 memory availability.
Upon detection of the troubleshooting criteria, IPCS_MS node 106 captures all messages of the call that corresponds to the criteria. The messages include the ones stored in the history buffer and all subsequent messages as part of the call.

All messages captured are stored in log files in "pcap" format, and all log files are stored onto the local disk. A pcap log file can include messages of multiple troubleshooting sessions. IPCS_IE node 104 will allow viewing of pcap messages corresponding to individual troubleshooting sessions. Note that any file format that can be read by the corresponding software in the IPCS_IE node 104 can be used.

A single troubleshooting session can consist of multiple pcap log files.

A log file is transferred to IPCS_IE node 104 at the following events:
  Periodically (period duration is configurable via IPCS_IE node 104)
  "Pull" request is received from IPCS_IE node 104
  Local log storage capacity at IPCS_MS 106 reaches the maximum storage capacity allowed.

There are three configurable levels of log file storage capacity. Each time a level is reached an alarm is generated. Once the log storage capacity reaches Level 3 (the maximum allowed level), log file management follows the mechanism according to the setting of the parameter "IPCS_IE Log Overwrite" in IPCS_IE case, and "IPCS_MS Log Overwrite" in IPCS_MS case. Refer below for a detailed description.

In the case where the local log storage reaches the log storage maximum capacity on IPCS_MS node 106 (for example due to file transfer delays/failures to IPCS_IE node 104), the following options are available by setting of the configuration parameter "IPCS_MS Log Overwrite" from the EMS (applied by default to all IPCS_MS nodes):
  "IPCS_MS Log Overwrite" is set to OFF: logging is stopped and old log files are saves. Once local log storage capacity is freed, new logs are captured and normal logging process resumes.
  "IPCS_MS Log Overwrite" is set to ON: logging continues and old log files are overwritten with new ones. Once local log storage capacity is freed, new logs are captured and normal logging process resumes.

In the case where the local log storage reaches the log storage maximum capacity on the IPCS_IE node 104, the following options are available by setting of the configuration parameter "IPCS_IE Log Overwrite" from the EMS:
  "IPCS_IE Log Overwrite" is set to OFF: old log files are kept and all new logs received from IPCS_MS nodes 106 are discarded. Once local log storage capacity is freed, new logs from IPCS_MS nodes 106 are accepted and normal logging process resumes.
  "IPCS_IE Log Overwrite" is set to ON: old log files are overwritten with new ones received from IPCS_MS nodes 106. Once local log storage capacity is freed, new logs from IPCS_MS nodes 106 are accepted and normal logging process resumes.

An archive mechanism at IPCS_IE node 104 is in place to allow log files archiving to an external server.

Disk space on IPCS_IE node 104 is partitioned to dedicate specific amount for log files generated for troubleshooting sessions.

Disk space on IPCS_MS nodes 106 is also partitioned to dedicate specific amount for log files generated for troubleshooting sessions.

The IPCS-MS 106 has a zero packet drop rate on any incoming packet stream at any of its incoming ports. This is achieved with the availability of input system buffering and processing powerhouse of the hardware and its engineering.

Figure 2:
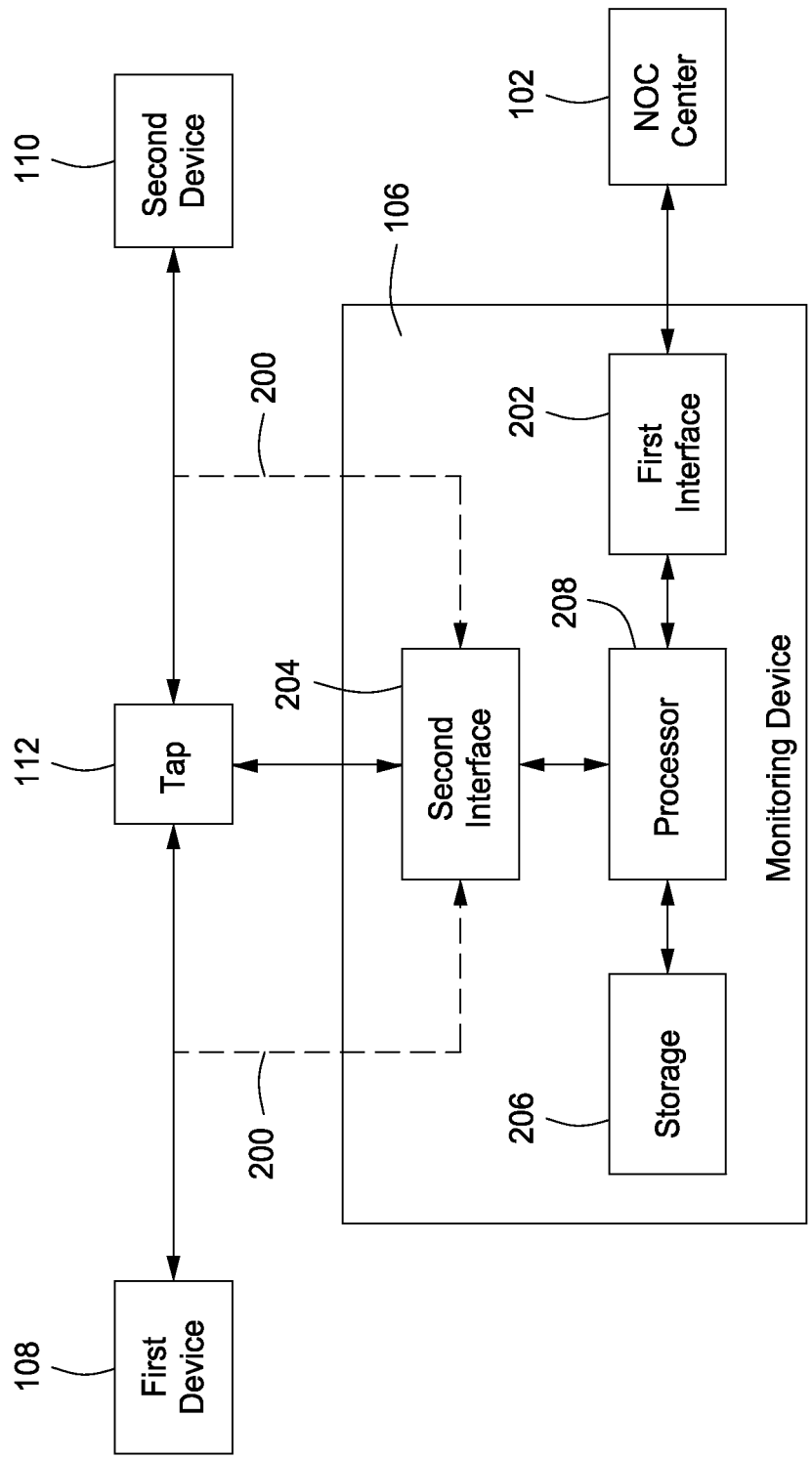
FIG. 2 a block diagram depicting an apparatus and system in accordance with one embodiment of the present invention.

Referring now to FIG. 2, a block diagram depicting an apparatus and system in accordance with one embodiment of the present invention is shown. As previously described, the monitoring device (IPCS_MS node) 106 is disposed between a first device 108 and a second device 110. The monitoring device 106 is communicably connected between the first device 108 and the second device 110 at point 112 (illustrated by dashed lines 200) or is communicably connected to a tap or tapping device 112 communicably connected (link) between the first device 108 and the second device 110. Each monitoring device 106 includes a first interface 202, a second interface 204, a data storage 206 and a processor 208 communicably coupled to the first interface 202, the second interface 204 and the data storage 206.

The processor 208 receives one or more troubleshooting criteria from the network control center 102 (IPCS_IE node 104) via the first interface 202, receives a message associated with one or more communications between the first device 108 and the second device 110 via the second interface 204, analyzes the received message and stores the analyzed message in the data storage 206 whenever the analyzed message satisfies the troubleshooting criteria. The one or more troubleshooting criteria comprise one or more data element criteria, one or more event-based criteria, one or more time-based criteria, one or more logical operators or a combination thereof.

Figure 3:
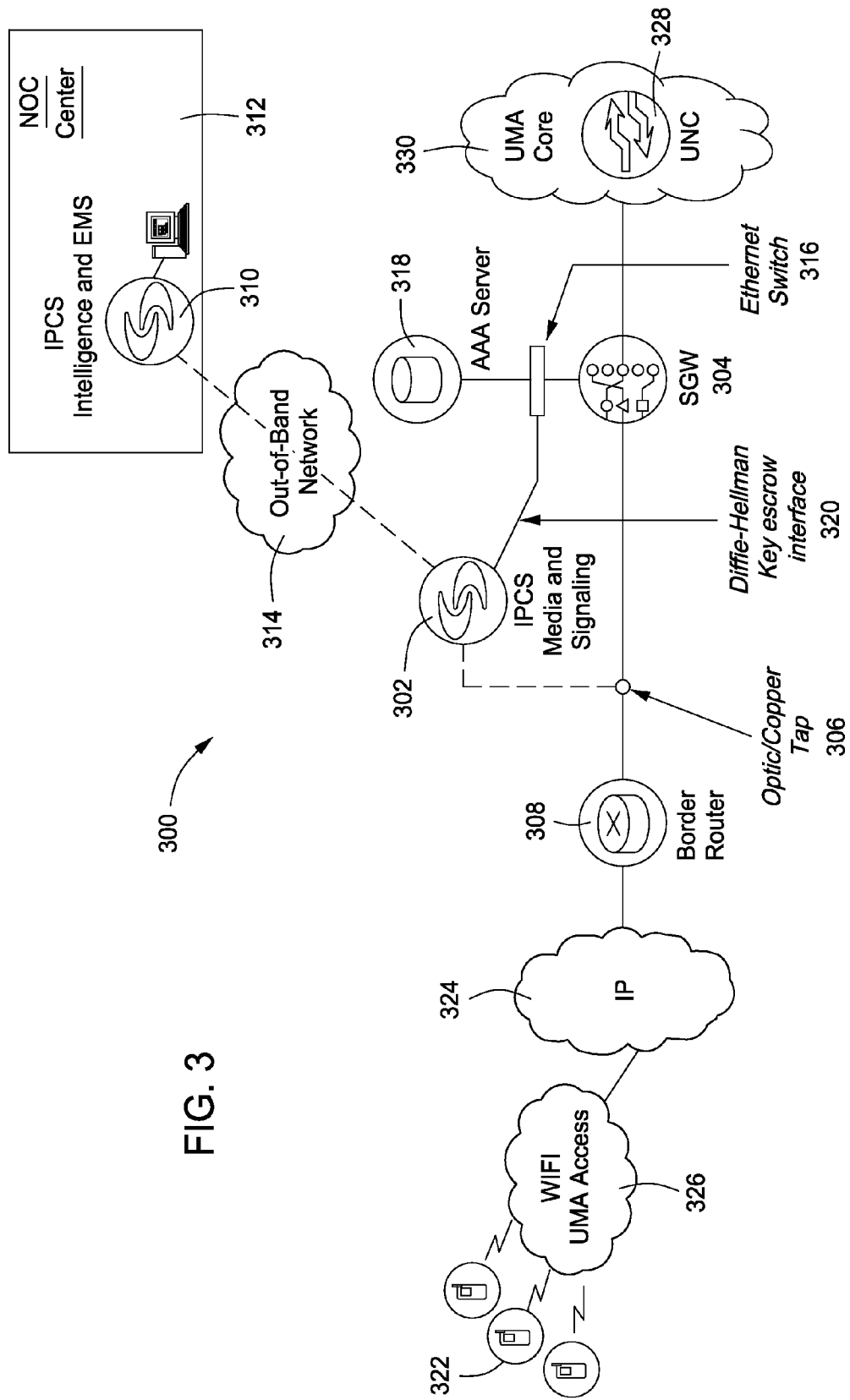
FIG. 3 depicts IPCS Media and Signaling device connectivity in an UMA network with a single secure gateway (SGW) in accordance with another embodiment of the present invention.

Now referring to FIG. 3, IPCS_MS device 302 connectivity in an UMA network 300 with a single SGW 304 in accordance with another embodiment of the present invention is shown. The IPCS_MS device or node 302 is deployed in a tap mode, which is a copper or optic tap 306 used on the link between SGW 304 and the border router 308 to mirror all packets exchanged on the link towards the IPCS_MS node 302. SGW 304 is also communicably coupled to UNC 328 in UMA core network 330. The IPCS_IE node 310 resides in the NOC 312 and communicates with all IPCS_MS nodes 302 deployed in the network 300 via an out-of-band network 314. A second tap 316, such as an Ethernet switch, is used on the link between the AAA Server (secure key source) 318 and SGW 304. A Diffie-Hellman Key escrow interface 320 is used between IPCS_MS node 302 and Ethernet switch 316 to obtain security keys so that secure communications between SGW 304 and user equipment 322 via border router 308, IP network 324 and WiFi UMA access 326 can be decrypted and analyzed. The IPCS_MS node 302 takes the role of analyzing each IP packet and looking for specific activities as pre-specified by the troubleshooting criteria. Upon findings of troubleshooting criteria matching, appropriate log files are created and stored at the local IPCS_MS node 302, then transferred to the IPCS_IE 310 for viewing and analysis.

Figure 4:
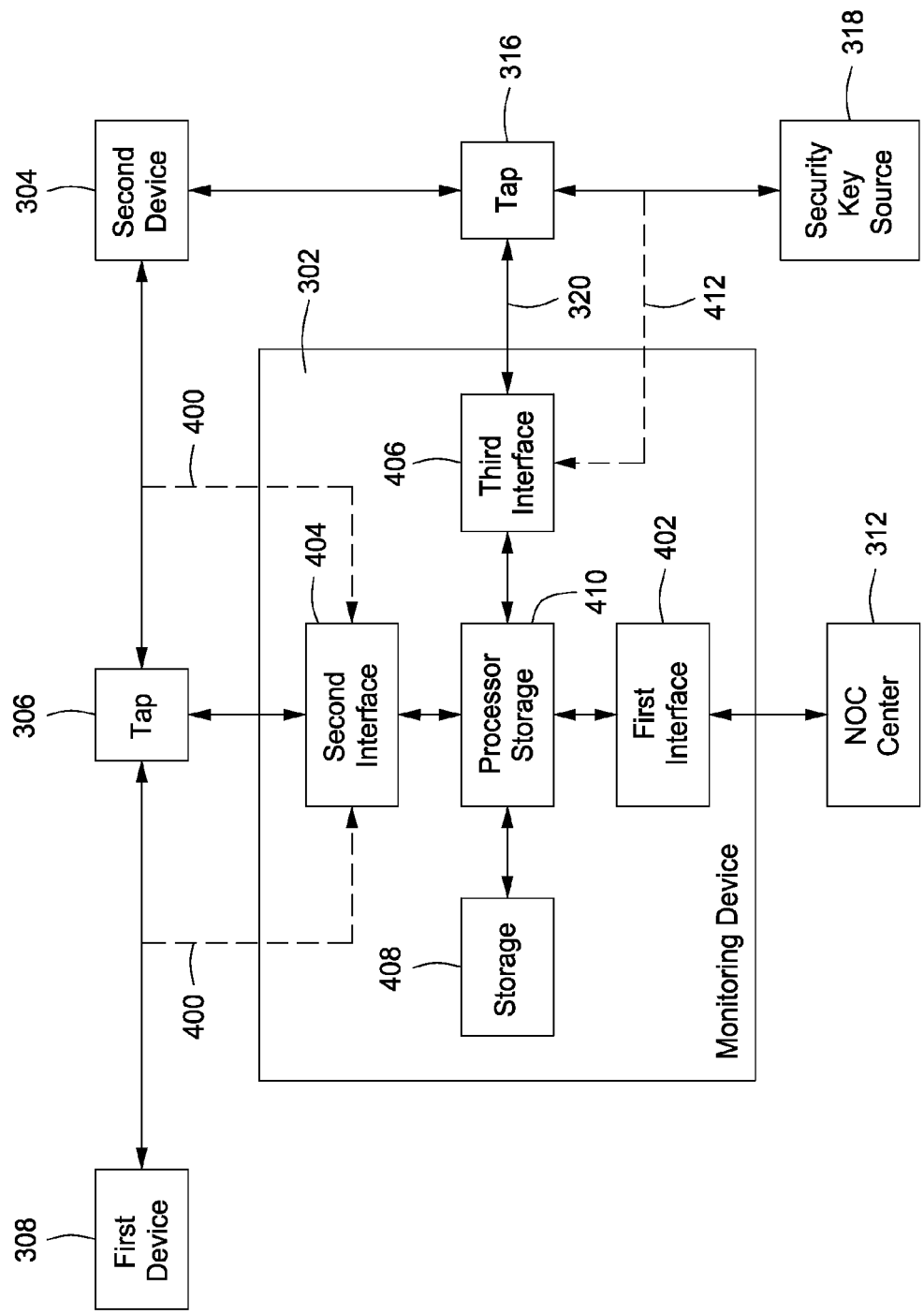
FIG. 4 a block diagram depicting an apparatus and system in accordance with another embodiment of the present invention.

Referring now to FIG. 4, a block diagram depicting an apparatus and system in accordance with another embodiment of the present invention is shown. A previously described, the monitoring device (IPCS_MS node) 302 is disposed between a first device 308 and a second device 304. The monitoring device 302 is communicably connected between the first device 308 and the second device 304 at point 306 (illustrated by dashed lines 400) or is communicably connected to a tap or tapping device 306 communicably connected (link) between the first device 308 and the second device 304. The monitoring device 302 is also communicably connected between the second device 304 and a security key source 318 at point 316 (illustrated by dashed lines 412) or is communicably connected to a tap or tapping device 316 communicably connected (link) between the first device 308 and the second device 304. Each monitoring device 302 includes a first interface 402, a second interface 404, a third interface 406, data storage 408 and a processor 410 communicably coupled to the first interface 402, second interface 404, third interface 406 and data storage 408.

Figure 5:
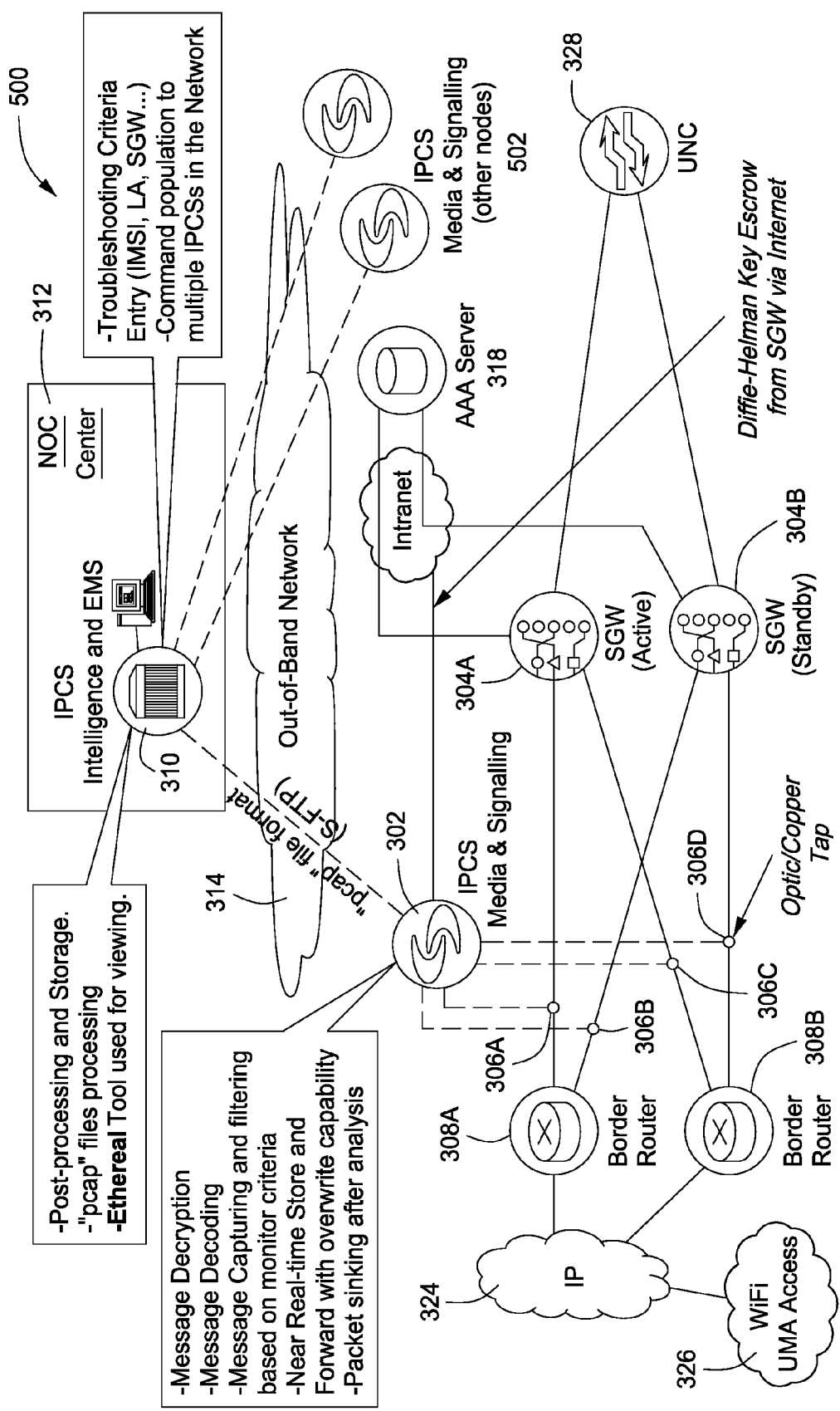
FIG. 5 depicts IPCS Media and Signaling device connectivity in an UMA network with active/standby SGWs in accordance with another embodiment of the present invention.

The processor 410 receives one or more troubleshooting criteria from the network control center 312 (IPCS_IE node 310) via the first interface 402, receives a message associated with one or more communications between the first device 308 and the second device 304 via the second interface 404, analyzes the received message and stores the analyzed message in the data storage 408 whenever the analyzed message satisfies the troubleshooting criteria. The one or more troubleshooting criteria comprise one or more data element criteria, one or more event-based criteria, one or more time-based criteria, one or more logical operators or a combination thereof The processor 410 also receives a security key via the third interface 406, stores the security key in the data storage 408 and decrypts the received message using the security key whenever the received message is encrypted Now referring to FIG. 5, IPCS_MS device 302 connectivity in an UMA network 500 with active/standby SGWs (304a and 304b) in accordance with another embodiment of the present invention is shown. The IPCS_MS device or node 302 is deployed in a tap mode, which are copper or optic taps (306a, 306b, 306c and 306d) used on the links between SGWs (304a and 304b) and the border routers (308a and 308b) to mirror all packets exchanged on the links towards the IPCS_MS node 302. SGWs (304a and 304b) are also communicably coupled to UNC 328 in UMA core network. The IPCS_IE node 310 resides in the NOC 312 and communicates with IPCS_MS node 302 and all other IPCE_MS nodes 502 deployed in the network 500 via an out-of-band network 314. A second tap is used on the links between the AAA Server (secure key source) 318 and SGWs (304a and 304b). A Diffie-Hellman Key escrow interface 320 is used between IPCS_MS node 302 and taps to obtain security keys so that secure communications between SGWs (304a and 304b) and user equipment via border routers (308a and 308b), IP network 324 and WiFi UMA access 326 can be decrypted and analyzed. The IPCS_MS node 302 takes the role of analyzing each IP packet and looking for specific activities as pre-specified by the troubleshooting criteria. Upon findings of troubleshooting criteria matching, appropriate log files are created and stored at the local IPCS_MS node 302, then transferred to the IPCS_IE 310 for viewing and analysis.

Figure 6:
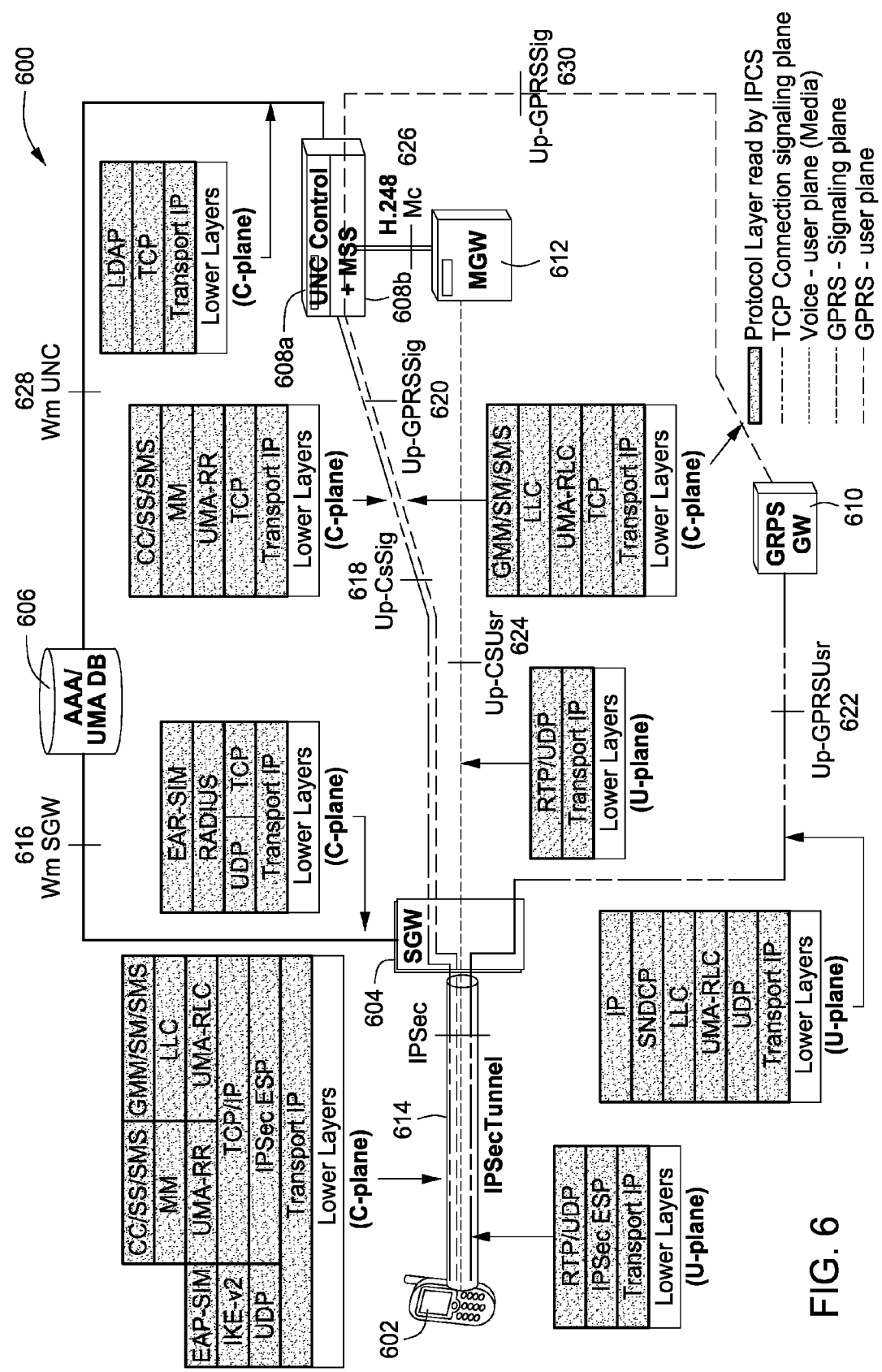
FIG. 6 depicts UMA network interfaces in accordance with one embodiment of the present invention.

Referring now to FIG. 6, UMA network 600 interfaces in accordance with one embodiment of the present invention are shown. Unlike existing systems, the present invention can monitor, decrypt, decode, analyze and store all messages meeting one or more troubleshooting criteria within the network 600. The network 600 includes user equipment 602 communicably coupled to SGW 604 via IPSec tunnel 614 (Up-GPRSUsr plane 622, Up-CSUsr plane 624, Up-GPRSSig plane 620 and Up-CsSig plane 618). SGW 604 is communicably coupled to AAA/UMA database 606 via Wm SGW 616, UNC 608a via Up-CsSig plane 618, MSS 608b via Up-GPRSSig plane 620, and GPRS Gateway 610 via Up-GPRSUsr plane 622. Media Gateway 612 is communicably coupled to SGW 604 via UP-CSUsr plane 624, and MSS 608 via Mc 626. UNC 608a is also communicably coupled to AAA/UMA database 606 via Um UNC 628. MSS 608b is also communicably coupled to GPRS Gateway 610 via Up-GPRSSig plane 630. The various protocol layers for the messages sent over the user and signaling planes are also shown. Examples of the messages sent over the user and signaling planes are well known.

Figure 7:
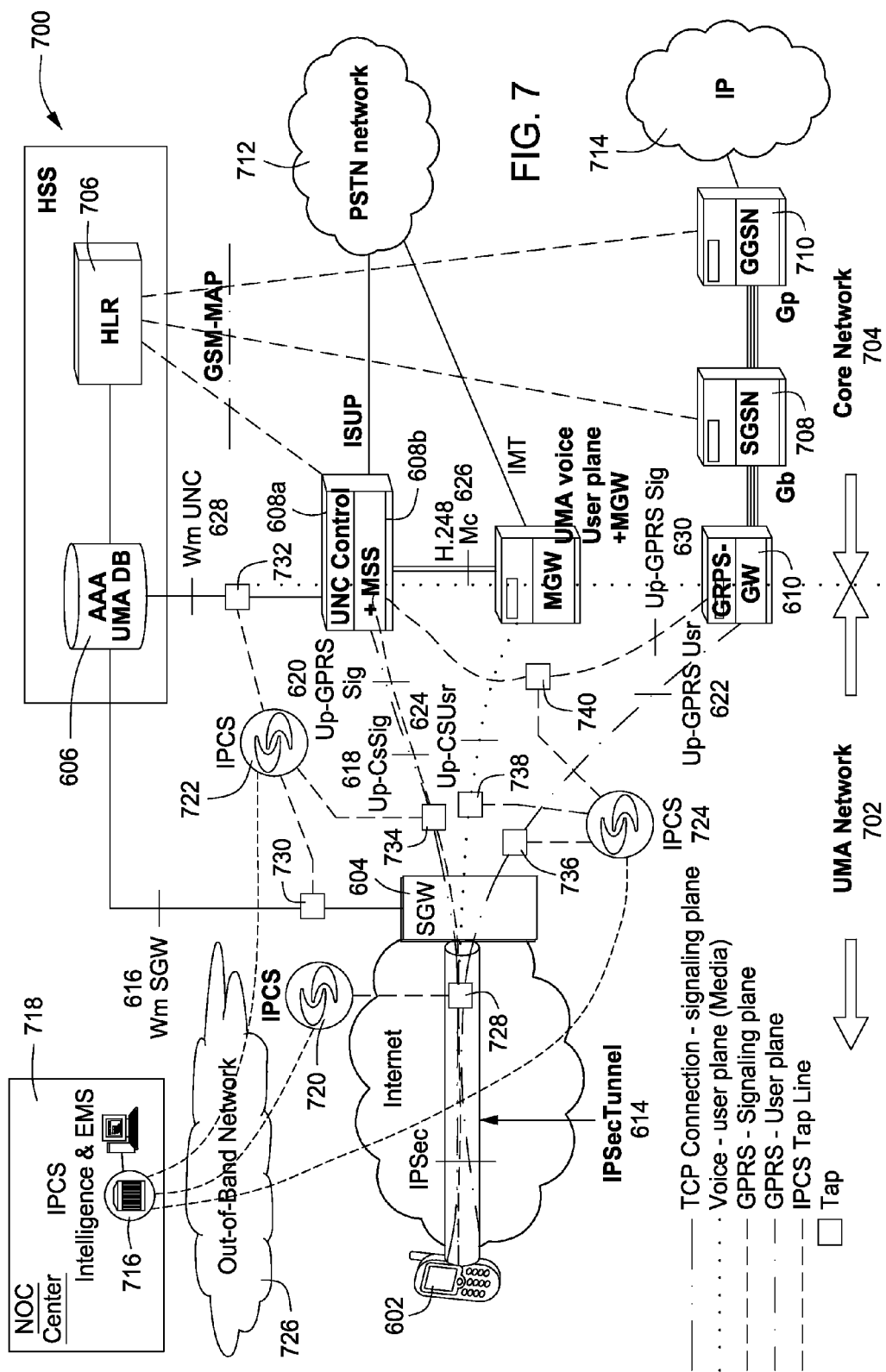
FIG. 7 depicts troubleshooting within an UMA network in accordance with another embodiment of the present invention.

Now referring to FIG. 7, troubleshooting within an UMA network 702 in accordance with another embodiment of the present invention is shown. The combined network 700 includes an UMA network 702 and a core network 704. The UMA network 702 includes user equipment 602 communicably coupled to SGW 604 via IPSec tunnel 614 (Up-GPRSUsr plane 622, Up-CSUsr plane 624, Up-GPRSSig plane 620 and Up-CsSig plane 618). SGW 604 is communicably coupled to AAA/UMA database 606 via Wm SGW 616, UNC 608a via Up-CsSig plane 618, MSS 608b via Up-GPRSSig plane 620, and GPRS Gateway 610 via Up-GPRSUsr plane 622. Media Gateway 612 is communicably coupled to SGW 604 via UP-CSUsr plane 624, and MSS 608 via Mc 626. UNC 608a is also communicably coupled to AAA/UMA database 606 via Um UNC 628. MSS 608b is also communicably coupled to GPRS Gateway 610 via Up-GPRSSig plane 630.

Core network 704 includes HLR 706, SGSN 708, GGSN 710, PSTN network 712 and IP network 714. HLR 706 is communicably coupled to AAA/UMA database 606, UNC/MSS 608, SGSN 708 and GGSN 710. SGSN 708 is also communicably coupled to GPRS Gateway 610 and GGSN 710, which is communicably coupled to IP network 714. PSTN network 712 is communicably coupled to UNC/MSS 608 and MGW 612.

The IPCS_IE node 716 resides in the NOC 718 and communicates with all IPCS_MS nodes (720, 722 and 724) deployed in UMA network 702 via an out-of-band network 726. IPCS_MS 720 is deployed in a tap mode, which is a copper or optic tap 728 used on the IPSec link 614 between SGW 604 and user equipment 602 to mirror all packets exchanged on the link 614. IPCS_MS 722 is also deployed in a tap mode, which are: (1) copper or optic tap 730 used on the Wm SGW link 616 between SGW 604 and AAA/UMA database 606 to mirror all packets exchanged on the link 616; (2) copper or optic tap 732 used on the Wm UNC link 628 between AAA/UMA database 606 and UNC 608a to mirror all packets exchanged on the link 628; and (3) copper or optic tap 734 used on the Up-CS Sig link 618 and Up-GPRS Sig link 620 between SGW 604 and UNC/MSS 608 to mirror all packets exchanged on the links 618 and 620. IPCS_MS 724 is also deployed in a tap mode, which are: (1) copper or optic tap 736 used on the Up-GPRS Sig link 622 between SGW 604 and GPRS-GW 610 to mirror all packets exchanged on the link 622; (2) copper or optic tap 738 used on the Up-CS Usr link 624 between SGW 604 and MGW 612 to mirror all packets exchanged on the link 624; and (3) copper or optic tap 740 used on the Up-GPRS Sig link 630 between GPRS-GW 610 and UNC/MSS 608 to mirror all packets exchanged on the link 630. The IPCS_MS nodes 720, 722 and 724 analyze each IP packet and look for specific activities as pre-specified by the troubleshooting criteria. Upon findings of troubleshooting criteria matching, appropriate log files are created and stored at the respective local IPCS_MS nodes 720, 722 and 724, and are then transferred to the IPCS_IE 716 for viewing and analysis.

Figure 8:
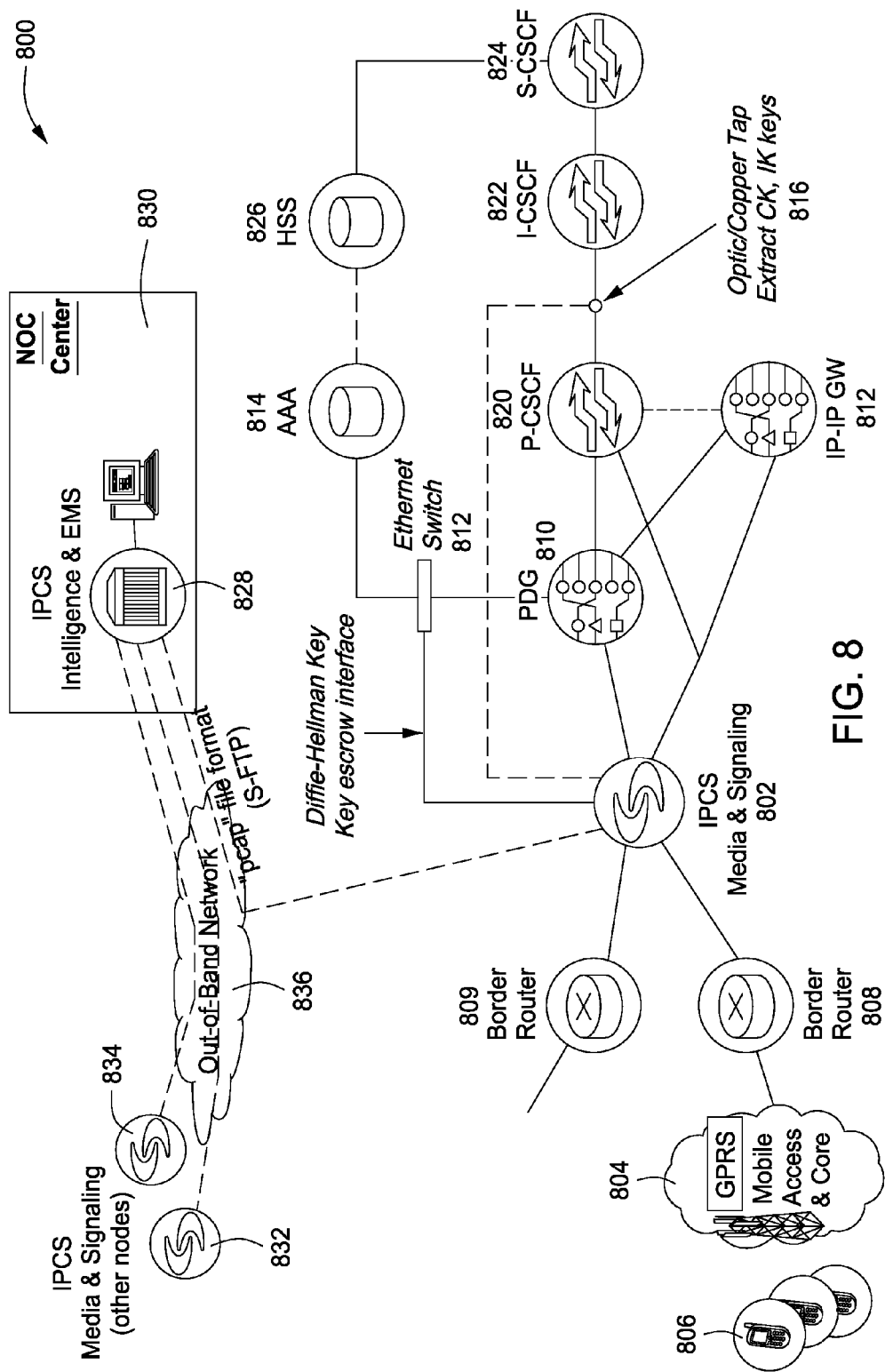
FIG. 8 depicts IPCS Media and Signaling device connectivity in an IP Multimedia Subsystem (IMS) network in accordance with another embodiment of the present invention.

Referring now to FIG. 8, IPCS_MS device 802 connectivity in an IP Multimedia Subsystem ("IMS") network 800 in accordance with another embodiment of the present invention is shown. The access network 804 is used to connect (i.e., communicably couple) the end users 806, such as mobile handsets, to border router 808. The IPCS_MS 802 is communicably coupled between border routers 808 and 809, PDG 810, and IP-IP GW 812. The IPCS_MS 802 is also communicably coupled to a tap or Ethernet switch 812, which is connected between PDG 810 and AAA Server 814. In addition IPCS_MS 802 is communicably coupled to a tap 816, which is connected between P-CSCF 820 and I-CSCF 822. P-CSCF 820 is also communicably coupled to PDG 810 and IP-IP GW 812. I-CSCF 822 is also communicably coupled to S-CSCF 824, which is communicably coupled to HSS 826, which is communicably coupled to AAA Server 814. Taps 812 and 816 give IPCS_MS node 802 access to security keys used in the network. The IPCS_IE node 828 resides in the NOC 830 and communicates with all IPCS_MS nodes (802, 832 and 834) via an out-of-band network 836. The IPCS_MS nodes 802, 832 and 836 analyze each IP packet and look for specific activities as pre-specified by the troubleshooting criteria. Upon findings of troubleshooting criteria matching, appropriate log files are created and stored at the respective local IPCS_MS nodes 802, 832 and 836, and are then transferred to the IPCS_IE 828 for viewing and analysis. The log files can be used to back track and extract specific messages related to a specific call.

Figure 9:
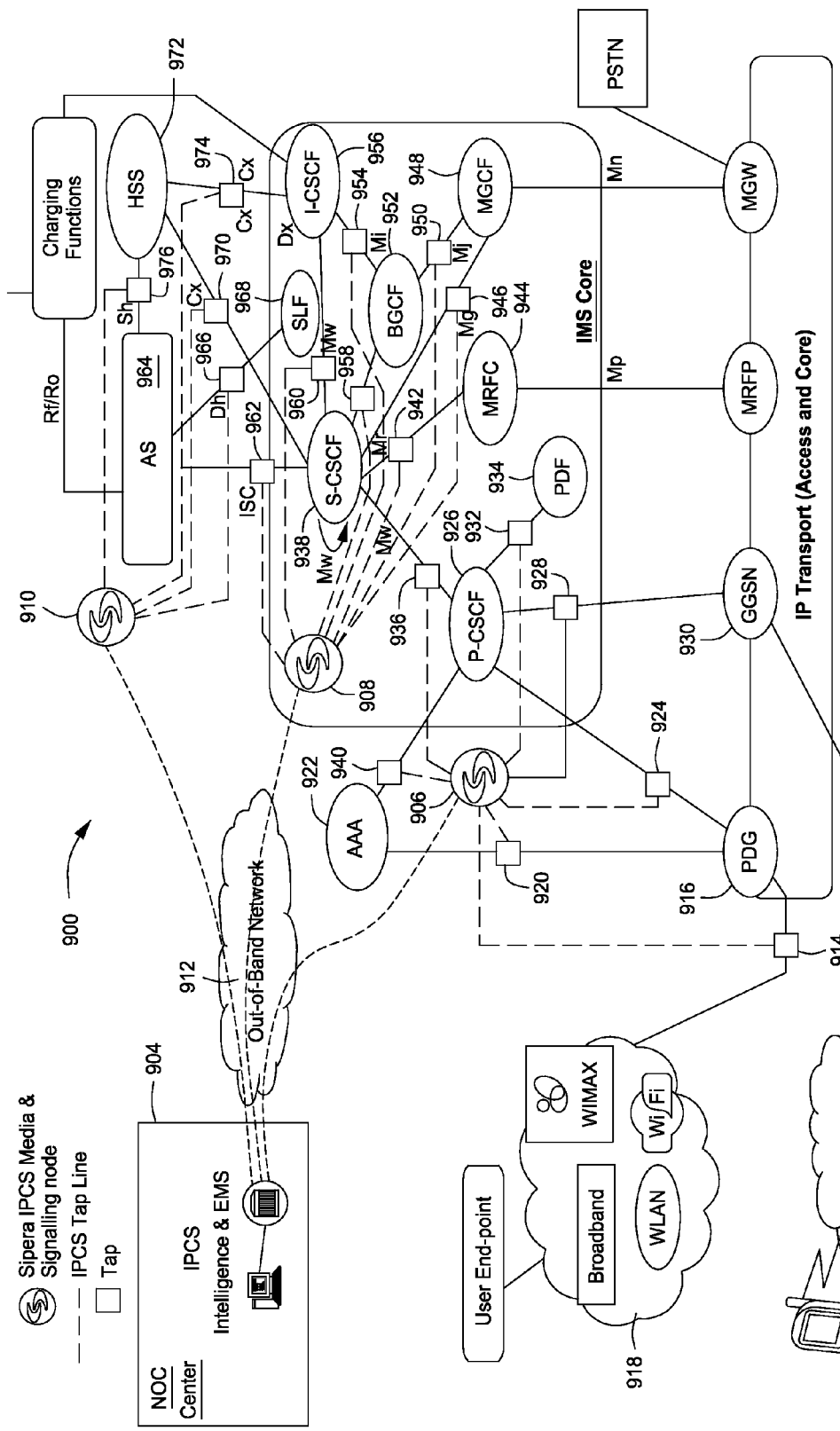
FIG. 9 depicts troubleshooting within an IMS network in accordance with another embodiment of the present invention.

Now referring to FIG. 9, troubleshooting within an IMS network 900 in accordance with another embodiment of the present invention is shown. The IPCS_IE node 902 resides in the NOC 904 and communicates with all IPCS_MS nodes (906, 908 and 910) deployed in IMS network 900 via an out-of-band network 912. IPCS_MS node 906 has the following taps: (1) tap 914 between PDG 916 and IP network 918; (2) tap 920 between PDG 916 and AAA Server 922; (3) tap 924 between PDG 916 and P-CSCF 926; (4) tap 928 between P-CSCF 926 and GGSN 930; (5) tap 932 between P-CSCF 926 and PDF 934; (6) tap 936 between P-CSCF 926 and S-CSCF 938; and (7) tap 940 between P-CSCF 926 and AAA Server 922. IPCS_MS node 908 has the following taps: (1) tap 942 between S-CSCF 938 and MRFC 944; (2) tap 946 between S-CSCF 938 and MGCF 948; (3) tap 950 between MGCF 938 and BGCF 952; (4) tap 954 between BGCF 952 and I-CSCF 956; (5) tap 958 between S-CSCF 938 and BGCF 952; (6) tap 960 between S-CSCF 938 and I-CSCF 956; and (7) tap 962 between S-CSCF 938 and AS 964. IPCS_MS node 910 has the following taps: (1) tap 966 between AS 964 and SLF 968; (2) tap 970 between S-CSCF 938 and HSS 972; (3) tap 974 between I-CSCF 956 and HSS 972; and (4) tap 976 between AS 964 and HSS 972. The IPCS_MS nodes 906, 908 and 910 analyze each IP packet and look for specific activities as pre-specified by the troubleshooting criteria. Upon findings of troubleshooting criteria matching, appropriate log files are created and stored at the respective local IPCS_MS nodes 906, 908 and 910, and are then transferred to the IPCS_IE 902 for viewing and analysis. The log files can be used to back track and extract specific messages related to a specific call.

Figure 10:
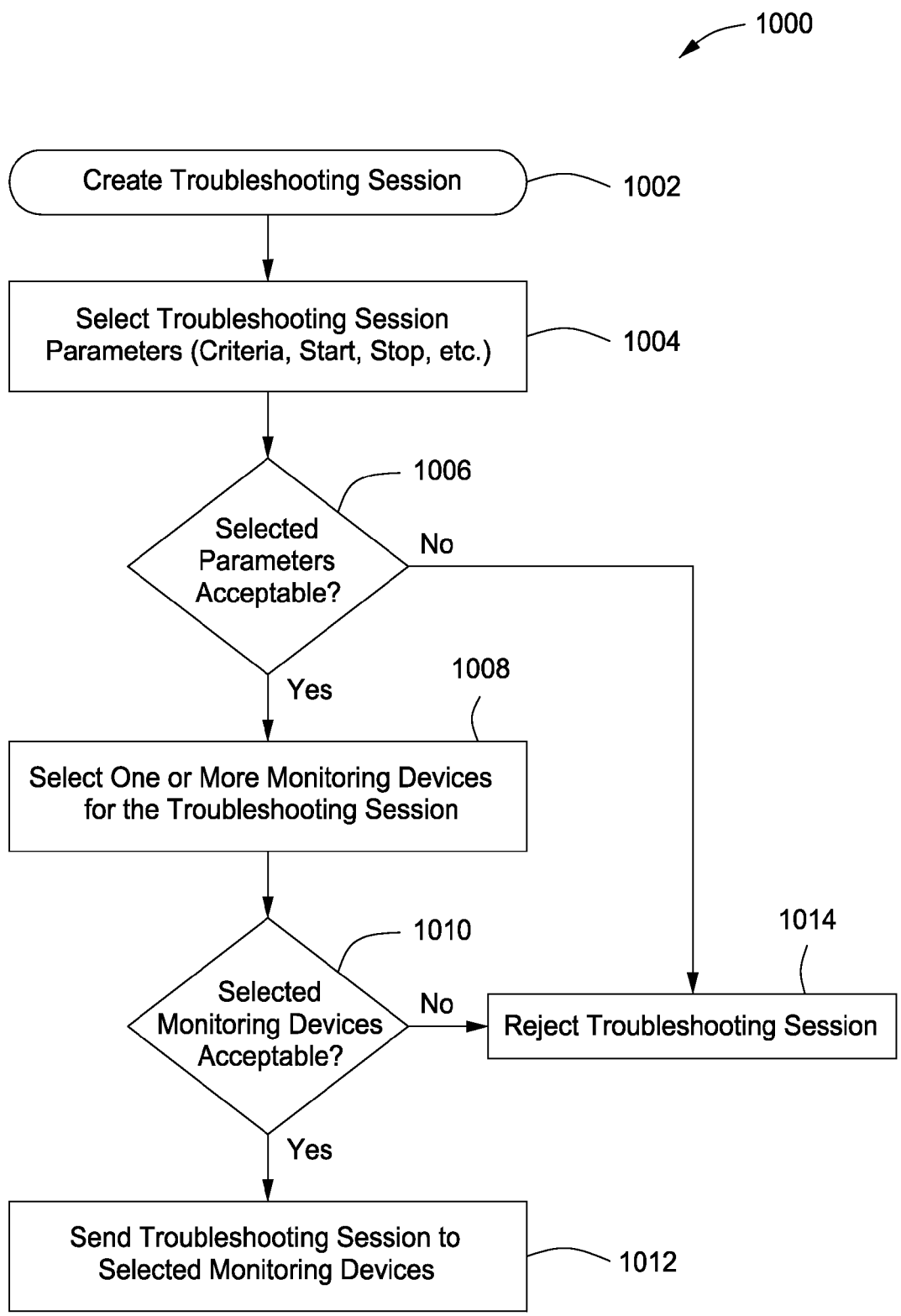
FIG. 10 is a flow chart depicting the creation of a troubleshooting session in accordance with one embodiment of the present invention.

Referring now to FIG. 10, a flow chart 1000 depicting the creation of a troubleshooting session (typically performed at an IPCS_IE) in accordance with one embodiment of the present invention is shown. The process begins in block 1002 and one or more troubleshooting session parameters are selected in block 1004. The one or more troubleshooting session parameters or criteria may include one or more data element criteria, one or more event-based criteria, one or more time-based criteria, one or more logical operators or a combination thereof. The one or more data elements may include an international mobile subscriber identity, an unlicensed mobile access classmark, a cell identity, a location area identity, a routing area identity, an access point identity, an Internet Protocol (IP) subnet mask, an IPsec tunnel identity IP address, a secure gateway identity IP address, an unlicensed network controller identity IP address, a media gateway identity IP address, a general packet radio service gateway identity IP address, a border router IP address, a user equipment uniform resource identifier, a transport layer security tunnel identity IP address, a packet data gateway identity IP address, a proxy call session control function identity IP address, a protocol type or all messages. The one or more event-based criteria may include an IPsec failure, one or more registration failure criteria, a general packet radio service attach failure, a packet data protocol context failure, a transport layer security failure. The one or more time-based criteria may include a start time, an end time, or a duration.

If the selected parameters are acceptable, as determined in decision block 1006, one or more monitoring devices (IPCS_MS) are selected for the troubleshooting session in block 1008. If the selected monitoring devices are acceptable, as determined in decision block 1010, the troubleshooting session(s) is sent to the selected monitoring devices (one or more IPCS_MS) in block 1012. If, however, the selected parameters are not acceptable, as determined in decision block 1006, or the selected monitoring devices are not acceptable, as determined in decision block 1010, the troubleshooting session is rejected in block 1014.

Figure 11:
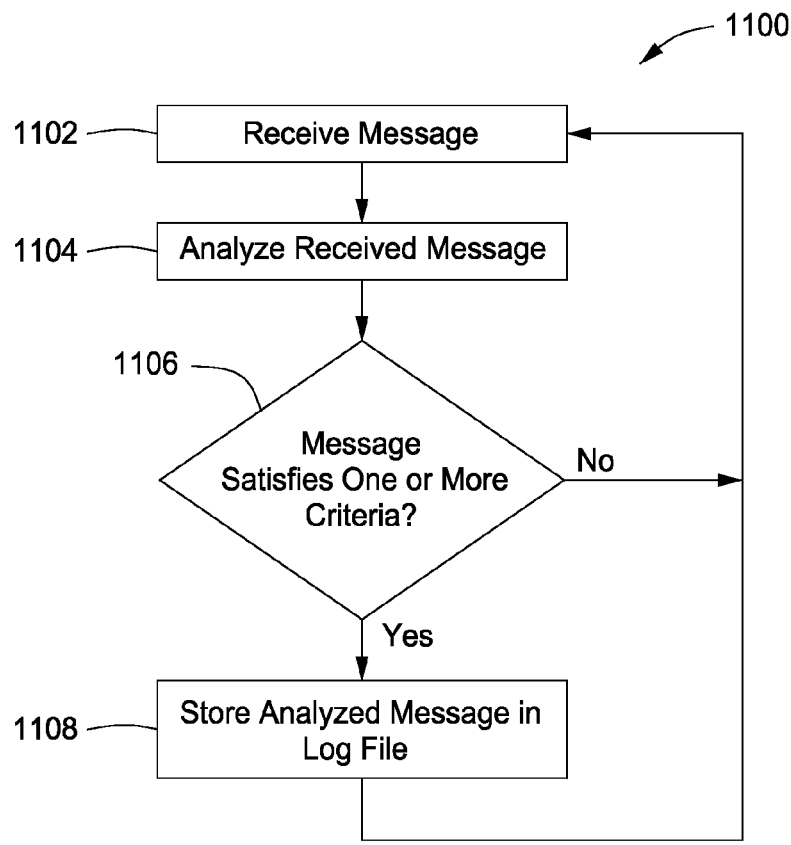
FIG. 11 is a flow chart depicting the troubleshooting of one or more communications between a first device and a second device in accordance with one embodiment of the present invention.

Now referring to FIG. 11, a flow chart 1100 depicting the troubleshooting of one or more communications between a first device and a second device in accordance with one embodiment of the present invention is shown. A monitoring device (IPCS_MS) disposed between the first device and the second device receives a message associated with the communication(s) in block 1102 and analyzes the received message in block 1104. If the message does not satisfy one or more troubleshooting criteria, as determined in decision block 1106, the process loops back to block 1102 to receive the next message. If, however, the analyzed message satisfies one or more of the troubleshooting criteria, as determined in decision block 1106, the analyzed message is stored in a log file in block 1108 and the process loops back to block 1102 to receive the next message.

The monitoring device can be communicably connected between the first device and the second device, or communicably connected to a tap communicably connected between the first device and the second device. The monitoring device can be an application level security node or an Internet Protocol Communication Security device. The first device or the second device can be a border router, a packet data gateway, a secure gateway, a signaling gateway, a network trusted entity, a device that creates a security key, a remote device, an application server, a home subscriber server, an interrogating call session control function, a service call session control function, a subscriber location function, a breakout gateway function controller, a media gateway control function, a media resource function controller, a proxy call session control function, a policy decision function, an access-authorization-accounting server, a gateway general packet radio service support node, an unlicensed network controller, a media gateway, a general packet radio service gateway or other communications device. The remote device can be an end user device, a mobile handset, a computer, a portable computer, a personal data assistant, a multimedia device or a combination thereof The message(s) can be one or more data packets, voice packets, multimedia packets or a combination thereof.

Figure 12:
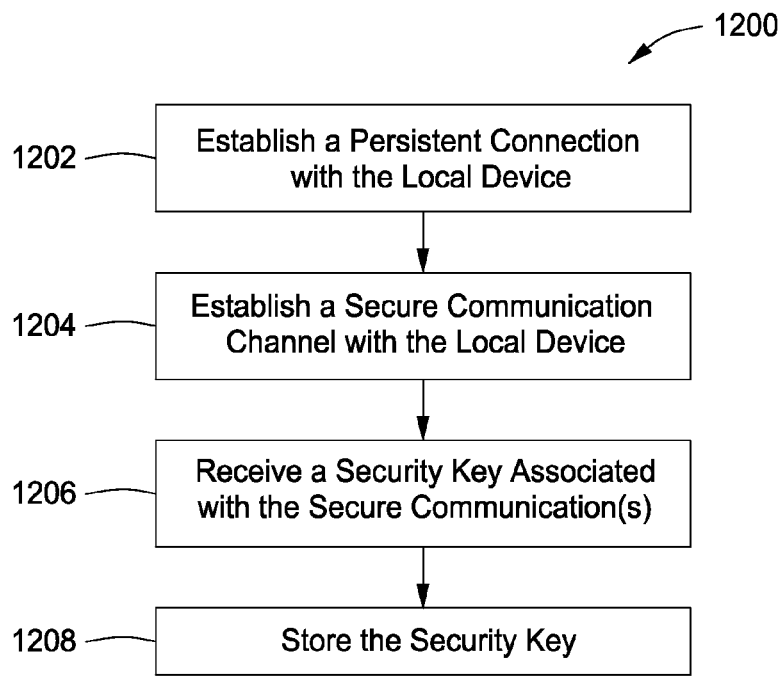
FIG. 12 is a flow chart depicting the creation of a secure communication channel between a monitoring device and a security key source in accordance with one embodiment of the present invention.

Referring now to FIG. 12, a flow chart 1200 depicting the creation of a secure communication channel between a monitoring device and a security key source in accordance with one embodiment of the present invention is shown. A persistent connection is established with the local device (security key source) in block 1202 and a secure communication channel is established with the local device (security key source) in block 1204. A security key associated with the secure communication(s) is received in block 1206 and the received security key is stored in a secure data storage in block 1208. Note that a new security key can be received whenever the security key associated with the communication(s) between the first device and the second device is changed, which can be on a per session or per call basis.

For example, as part of the IKE-v2 protocol for setting-up an IPSec tunnel between the UMA mobile handset and the SGW, SGW assigns a new Diffie-Hellman key for every session in an ephemeral fashion and a random generation method i.e. the key is different for every IKE-v2 session. In order to decode all messages of IKE-v2, IPCS_MS node is required to know the Diffie-Hellman key at every session. The Diffie-Hellman escrow interface allows SGW to send the Diffie-Hellman key to IPCS_MS at every session. The following apply to the interface:

- SGW sends the Diffie-Helman key to IPCS_MS at every session.
- Diffie-Hellman (DH) Key is escrowed to the IPCS_MS node from the SGW via an ethernet switch connection or any other means that allows TCP connection establishment.
- Independent IPSec session is created b/w IPCS_MS node and SGW and is used for the exchange of the Diffie-Hellman Key only.
- Once received, the DH key is stored in a Key Vault safe where it cannot be read via software nor hardware exploitation. Once in the Key Vault, IPCS_MS can perform arithmetic operations on the DH key but cannot read it. This mechanism ensures that the DH Key is never exposed outside the SGW and its secrecy is maintained.

Note that this process is not limited to the IPSec tunnel between the UMA mobile handset and the SGW and is, therefore, applicable to any interface monitored by the IPCS (see FIGS. 7, 8 and 9).

Figure 13A:
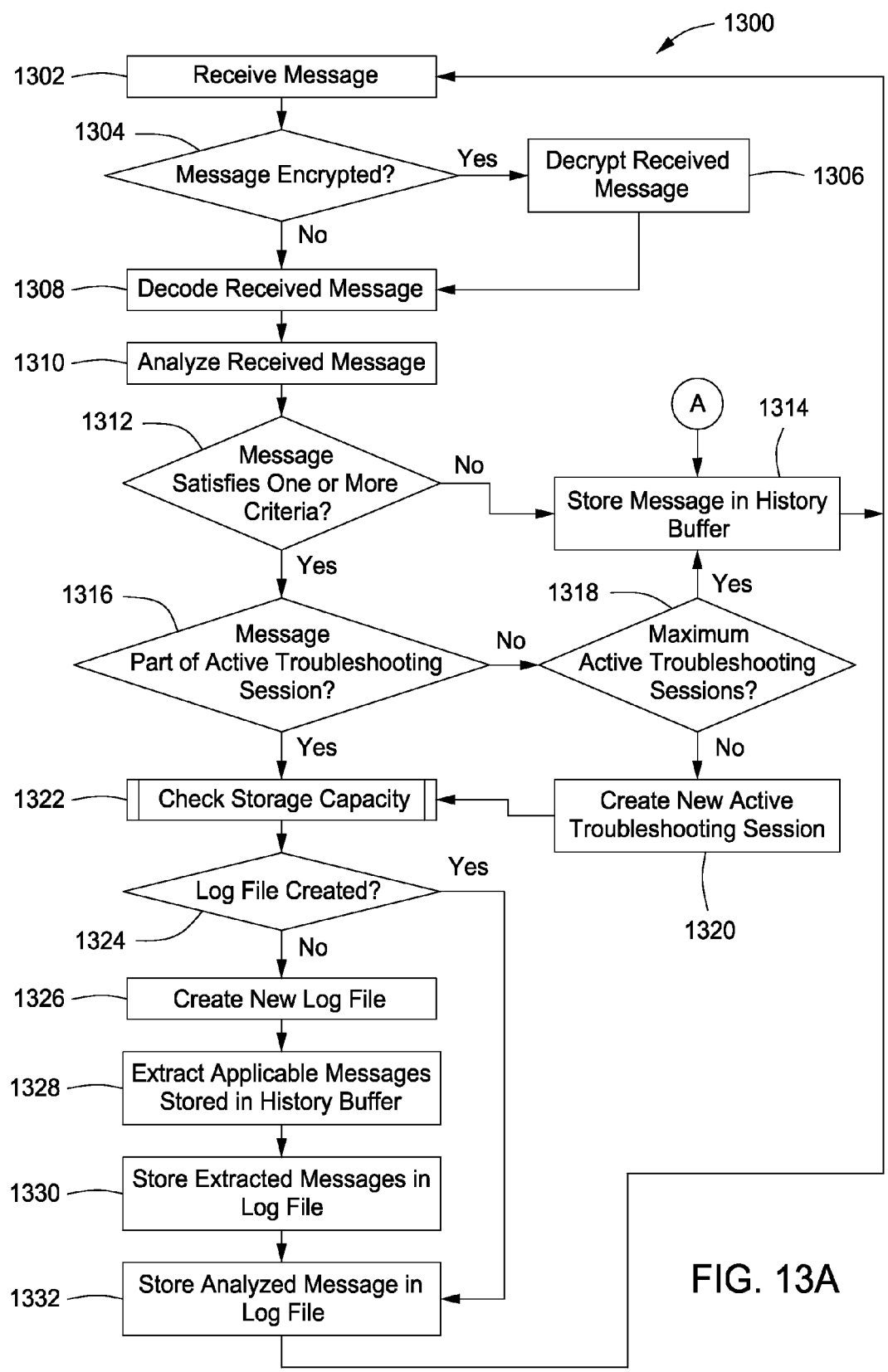
FIGS. 13A and 13B are flow charts depicting the troubleshooting of one or more communications between a first device and a second device in accordance with another embodiment of the present invention.
Figure 13B:
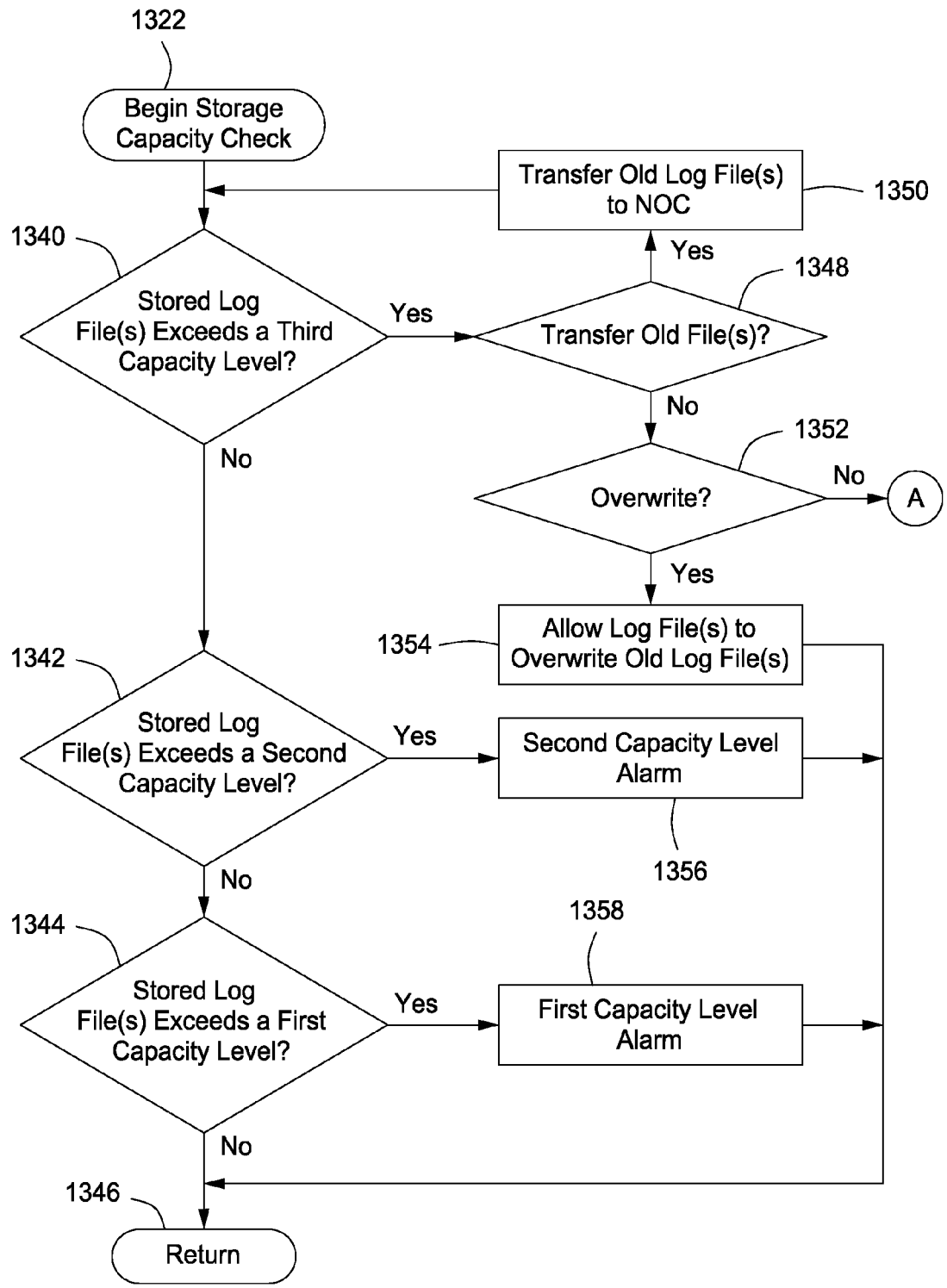

Now referring to FIGS. 13A and 13B, flow charts depicting the troubleshooting 1300 of one or more communications between a first device and a second device in accordance with another embodiment of the present invention are shown. A monitoring device (IPCS_MS) disposed between the first device and the second device receives a message associated with the communication(s) in block 1302. If the received message is encrypted, as determined in decision block 1304, the received message is decrypted in block 1306. Thereafter, or if the message is not encrypted, as determined in decision block 1304, the received message is decoded in block 108 and analyzed in block 1310. If the message does not satisfy one or more troubleshooting criteria, as determined in decision block 1312, the message is stored in a history buffer in block 1314 and the process loops back to block 1302 to receive the next message. If, however, the analyzed message satisfies one or more of the troubleshooting criteria, as determined in decision block 1312, and the message is not part of an active troubleshooting session, as determined in decision block 1316, and the maximum number of troubleshooting sessions are active, as determined in decision block 1318, the message is stored in a history buffer in block 1314 and the process loops back to block 1302 to receive the next message. If, however, the maximum number of troubleshooting sessions are not active, as determined in decision block 1318, a new active troubleshooting session is created in block 1320. Thereafter, or if the message is part of an active troubleshooting session, as determined in decision block 1316, the local storage capacity is checked in process block 1322 (See FIG. 13B). Thereafter, if a log file has not been created for the troubleshooting session, as determined in decision block 1324, a new log file is created in block 1326. Applicable messages stored in the history buffer are extracted in block 1328 and stored in the log file in block 1330. The extracted messages can relate to a specified message or a specified communication session or a combination thereof. Thereafter, or if the log file has already been created, as determined in decision block 1324, the analyzed message is stored in the log file in block 1332 and the process loops back to block 1302 to receive the next message.

The local storage check process (IPCS_MS) begins in block 1322 (See FIG. 13B) where one or more predetermined actions are performed whenever the existing log files exceed one or more capacity levels. If the stored log files do not exceed a third capacity level, as determined in decision block 1340, and a second capacity level, as determined in decision block 1342, and a first capacity level, as determined in decision block 1344, the process returns in block 1346 to check to see whether a log file has been created in decision block 1324. If, however, the stored log files exceed a third capacity level, as determined in decision block 1340, and old log files can be transferred to the NOC (IPCS_IE), as determined in decision block 1348, the old log files are transferred to the NOC (IPCS_IE) in block 1350 and the process loops back to decision block 1340 to recheck the capacity levels. If, however, the old log files cannot be transferred to the NOC (IPCS_IE), as determined in decision block 1348, and the local log files cannot be overwritten, as determined in decision block 1352, the process returns to store the message in a history buffer in block 1314 and loop back to block 1302 to receive the next message. If, however, the local log files can be overwritten, as determined in decision block 1352, the new log files are allowed to write over the old log files in block 1354 and the process returns in block 1346 to check to see whether a log file has been created in decision block 1324. If, however, the stored log files exceed a second capacity level, as determined in decision block 1342, a second capacity level alarm is issued in block 1356 and the process returns in block 1346 to check to see whether a log file has been created in decision block 1324. If, however, the stored log files exceed a first capacity level, as determined in decision block 1344, a first capacity level alarm is issued in block 1358 and the process returns in block 1346 to check to see whether a log file has been created in decision block 1324.

The following configuration parameters can be used for this monitoring feature:

IPCS_MS Log File Storage Capacity Level 1
Type: Integer
Unite: percentage
Values and range: 0-100
Default value: 80
Description: Identifies the first level of log storage capacity on IPCS_MS.
IPCS_MS Log File Storage Capacity Level 2
Type: Integer
Unite: percentage
Values and range: 0-100
Default value: 90
Description: Identifies the second level of log storage capacity on IPCS_MS.
IPCS_MS Log File Storage Capacity Level Max
Type: Integer
Unite: percentage
Values and range: 0-100
Default value: 98
Description: Identifies the maximum level of log storage capacity on IPCS_MS.

IPCS_MS Log Overwrite
Type: Boolean
Unite: Flag
Values and range: ON/OFF
Default value: OFF
Description: when set to ON, stored log files are overwritten by newer ones.
When set to OFF, stored log files are saved, and new log files are discarded.
Max_Troubleshooting_Session_per_IPCS_MS
Type: Integer
Unite: Value
Values and range: 0-20
Default value: 20
Description: Maximum allowed number of troubleshooting sessions that can be activated on a dingle IPC_MS at any given time. If exceeded, all new Troubleshooting sessions are rejected on the specific IPCS_MS.
Max_Troubleshooting_Criteria_per_session
Type: Integer
Unite: value
Values and range: 1-10
Default value: 10
Description: Maximum allowed number of criteria that can be included in a single Troubleshooting session. If exceeded, the troubleshooting session request is rejected.
Log_File_Transfer_Periodicity
Type: Integer
Unite: minutes
Values and range: 5, 15, 30, 60
Default value: 15
Description: Transfer periodicity for log files from IPCS_MS to IPCS_IE over S-FTP session.

Figure 14:
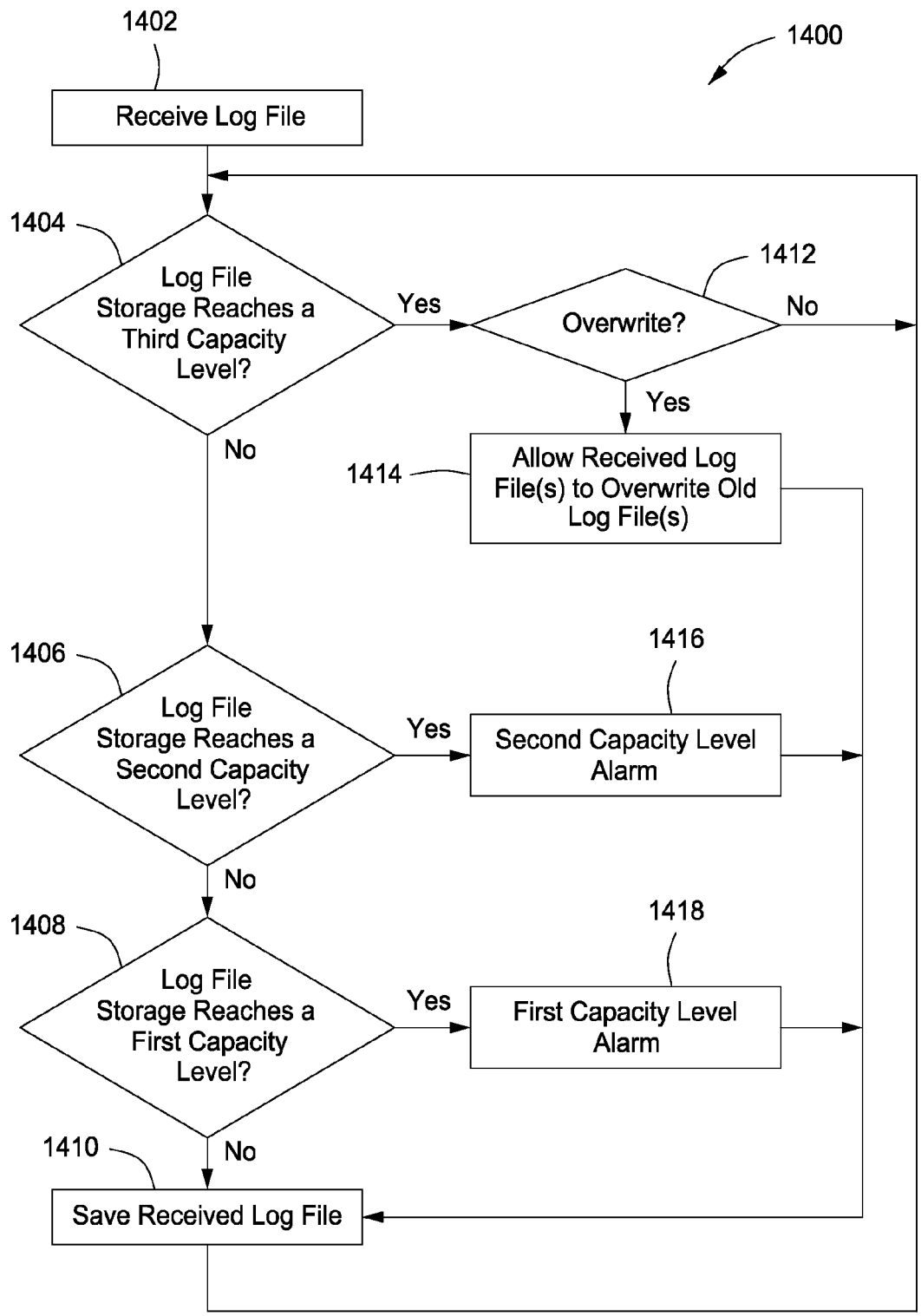
FIG. 14 is a flow chart depicting the receipt and storage of log files from one or more monitoring devices a method in accordance one embodiment of the present invention.

Referring now to FIG. 14, a flow chart 140 0 depicting the receipt and storage of log files from one or more monitoring devices (IPCS_MS) in accordance with one embodiment of the present invention is shown. A log file is received at the IPCS_IE in block 1402. If the stored log files do not exceed a third capacity level, as determined in decision block 1404, and a second capacity level, as determined in decision block 1406, and a first capacity level, as determined in decision block 1408, the received log file is stored in block 1410 and the process loops back to receive the next log file in block 1402. If, however, the stored log files exceed a third capacity level, as determined in decision block 1404, and the log files cannot be overwritten, as determined in decision block 1412, the process loops back to receive the next log file in block 1402. If, however, the log files can be overwritten, as determined in decision block 1412, the new log files are allowed to write over the old log files in block 1414 and the received log file is stored in block 1410 and the process loops back to receive the next log file in block 1402. If, however, the stored log files exceed a second capacity level, as determined in decision block 1406, a second capacity level alarm is issued in block 1416 and the received log file is stored in block 1410 and the process loops back to receive the next log file in block 1402. If, however, the stored log files exceed a first capacity level, as determined in decision block 1408, a first capacity level alarm is issued in block 1418 and the received log file is stored in block 1410 and the process loops back to receive the next log file in block 1402.

The following configuration parameters are used for this monitoring feature:
IPCS_IE Log File Storage Capacity Level 1
Type: Integer
Unite: percentage
Values and range: 0-100
Default value: 80
Description: Identifies the first level of log storage capacity on IPCS_IE.
IPCS_IE Log File Storage Capacity Level 2
Type: Integer
Unite: percentage
Values and range: 0-100
Default value: 90
Description: Identifies the second level of log storage capacity on IPCS_IE.
IPCS_IE Log File Storage Capacity Level Max
Type: Integer
Unite: percentage
Values and range: 0-100
Default value: 98
Description: Identifies the maximum level of log storage capacity on IPCS_IE.
IPCS_IE Log Overwrite
Type: Boolean
Unite: Flag
Values and range: ON/OFF
Default value: OFF
Description: when set to ON, stored log files are overwritten by newer ones.
When set to OFF, stored log files are saved, and new log files are discarded.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:
1. A method for troubleshooting one or more communication(s) between a first device and a second device, comprising the steps of:
receiving a mirrored message associated with the one or more communication(s) at a monitoring device disposed between the first device and the second device such that the monitoring device monitors the one or more communication(s) between the first device and the second device;
analyzing the received mirrored message to provide an analyzed mirrored message;
storing the analyzed mirrored message in one or more log files whenever the analyzed mirrored message satisfies one or more troubleshooting criteria;
providing the one or more log files for post-processing, analysis and troubleshooting, wherein the one or more communication(s) between the first and second devices are an encrypted communication;
decrypting the received mirrored message using a security key;
wherein the foregoing steps are performed by the monitoring device;
establishing an encrypted network communication channel between the monitoring device and a security device;
receiving, at the monitoring device, the security key from the security device via the encrypted network communication channel; and
storing the security key.

2. The method as recited in claim 1, further comprising the step of receiving the one or more troubleshooting criteria.

3. The method as recited in claim 1, wherein the one or more troubleshooting criteria comprise one or more data element criteria, one or more event-based criteria, one or more time-based criteria, one or more logical operators or a combination thereof.

4. The method as recited in claim 3, wherein:
the one or more data elements comprise an international mobile subscriber identity, an unlicensed mobile access classmark, a cell identity, a location area identity, a routing area identity, an access point identity, an Internet Protocol (IP) subnet mask, an IPsec tunnel identity IP address, a secure gateway identity IP address, an unlicensed network controller identity IP address, a media gateway identity IP address, a general packet radio service gateway identity IP address, a border router IP address, a user equipment uniform resource identifier, a transport layer security tunnel identity IP address, a packet data gateway identity IP address, a proxy call session control function identity IP address, a protocol type or all messages;
the one or more event-based criteria comprise an IPsec failure, one or more registration failure criteria, a general packet radio service attach failure, a packet data protocol context failure, a transport layer security failure; or
the one or more time-based criteria comprise a start time, an end time, or a duration.

5. The method as recited in claim 1, further comprising the steps of:
creating a troubleshooting session containing the one or more troubleshooting criteria;
sending the troubleshooting session to the monitoring device; and
receiving one or more log files containing the stored messages corresponding to the troubleshooting session.

6. The method as recited in claim 1, further comprising the step of:
storing the analyzed message in a buffer whenever the analyzed message does not satisfy any of the troubleshooting criteria.

7. The method as recited in claim 1, further comprising the step of receiving a new security key whenever the security key associated with the communication(s) between the first device and the second device is changed.

8. The method as recited in claim 7, wherein the security key is changed on a per session or per call basis.

9. The method as recited in claim 1, wherein the monitoring device is communicably connected between the first device and the second device, or is communicably connected to a tap communicably connected between the first device and the second device.

10. The method as recited in claim 1, wherein:
the monitoring device comprises an application level security node or an Internet Protocol Communication Security device;
the first device or the second device comprises a border router, a packet data gateway, a secure gateway, a signaling gateway, a network trusted entity, a device that creates a security key, a remote device, an application server, a home subscriber server, an interrogating call session control function, a service call session control function, a subscriber location function, a breakout gateway function controller, a media gateway control function, a media resource function controller, a proxy call session control function, a policy decision function, an access-authorization-accounting server, a gateway general packet radio service support node, an unlicensed network controller, a media gateway, a general packet radio service gateway or other communications device;
the remote device comprises an end user device, a mobile handset, a computer, a portable computer, a personal data assistant, a multimedia device or a combination thereof; or
the message(s) comprise one or more data packets, voice packets, multimedia packets or a combination thereof.

11. The method as recited in claim 1, wherein the one or more troubleshooting criteria comprises an unlicensed mobile access classmark.

12. The method as recited in claim 1, wherein the one or more troubleshooting criteria comprises a cell identity.

13. The method as recited in claim 1, wherein the one or more troubleshooting criteria comprises an Internet Protocol (IP) subnet mask.

14. The method as recited in claim 1, wherein the one or more troubleshooting criteria comprises an IPsec tunnel identity IP address.

15. The method as recited in claim 1, wherein the one or more troubleshooting criteria comprises a transport layer security tunnel identity IP address.

16. The method as recited in claim 1, wherein the one or more troubleshooting criteria comprises an IPsec failure.

17. The method as recited in claim 1, wherein the one or more troubleshooting criteria comprises a registration failure criteria.

18. A computer program embodied on a non-transitory computer readable medium executable by a computerized monitoring device for troubleshooting one or more communication(s) between a first device and a second device, the computer program comprising:
a code segment for receiving a mirrored message associated with the one or more communication(s) at the monitoring device disposed between the first device and the second device such that the monitoring device monitors the one or more communication(s) between the first device and the second device;
a code segment for analyzing the received mirrored message to provide an analyzed message;
a code segment for storing the analyzed message in one or more log files whenever the analyzed message satisfies one or more troubleshooting criteria, wherein the one or more communication(s) between the first and second devices are an encrypted communication;

a code segment for decrypting the received mirrored message using a security key;

a code segment for providing the one or more log files for post-processing, analysis and troubleshooting;

a code segment for establishing an encrypted network communication channel between the monitoring device and a security device;

a code segment for receiving, at the monitoring device, the security key from the security device via the encrypted network communication channel; and a code segment for storing the security key.

19. A method for troubleshooting one or more communication(s) between a first device and a second device, comprising the steps of:

receiving a mirrored message associated with the one or more communication(s) at a monitoring device disposed between the first device and the second device such that the monitoring device monitors the one or more communication(s) between the first device and the second device;

analyzing the received mirrored message to provide an analyzed message;

storing the analyzed message in one or more log files whenever the analyzed message satisfies one or more troubleshooting criteria;

providing the one or more log files for post-processing, analysis and troubleshooting, wherein the one or more communication(s) between the first and second device are an encrypted communication;

decrypting the received mirrored message using a security key;

wherein the foregoing steps are performed by the monitoring device; and receiving a new security key whenever the security key associated with the one or more communication(s) between the first device and the second device is changed, wherein the security key is changed on a per session or per call basis.

* * * * *